United States Patent
Rhodes

(10) Patent No.: US 7,415,667 B2
(45) Date of Patent: Aug. 19, 2008

(54) GENERATING AUGMENTED NOTES AND SYNCHRONIZING NOTES AND DOCUMENT PORTIONS BASED ON TIMING INFORMATION

(75) Inventor: Bradley J. Rhodes, Palo Alto, CA (US)

(73) Assignee: Ricoh Company, Ltd., Tokyo (JP)

( * ) Notice: Subject to any disclaimer, the term of this patent is extended or adjusted under 35 U.S.C. 154(b) by 323 days.

(21) Appl. No.: 10/355,378

(22) Filed: Jan. 31, 2003

(65) Prior Publication Data
US 2004/0153969 A1 Aug. 5, 2004

(51) Int. Cl.
*G06F 15/00* (2006.01)

(52) U.S. Cl. ............ 715/263; 715/200; 382/179; 382/184; 382/187

(58) Field of Classification Search .......... 715/500, 715/512, 541, 200, 263, 243, 255–256, 262, 715/268; 382/175–179, 187, 173, 184, 188–190; 345/467–468
See application file for complete search history.

(56) References Cited

U.S. PATENT DOCUMENTS

| | | | |
|---|---|---|---|
| 5,809,318 A | 9/1998 | Rivette et al. | |
| 5,831,615 A * | 11/1998 | Drews et al. | 715/768 |
| 5,970,455 A | 10/1999 | Wilcox et al. | |
| 5,995,936 A | 11/1999 | Brais et al. | |
| 6,279,014 B1 * | 8/2001 | Schilit et al. | 715/512 |
| 6,396,481 B1 | 5/2002 | Challa et al. | |
| 6,452,615 B1 * | 9/2002 | Chiu et al. | 715/776 |
| 6,625,296 B2 * | 9/2003 | Price et al. | 382/100 |
| 6,651,218 B1 * | 11/2003 | Adler et al. | 715/530 |
| 6,658,623 B1 * | 12/2003 | Schilit et al. | 715/513 |
| 6,687,876 B1 * | 2/2004 | Schilit et al. | 715/512 |
| 6,751,779 B1 * | 6/2004 | Kurosawa et al. | 715/520 |
| 6,766,494 B1 * | 7/2004 | Price et al. | 715/513 |
| 6,909,805 B2 * | 6/2005 | Ma et al. | 382/170 |
| 2002/0079371 A1 * | 6/2002 | Bobrow et al. | 235/454 |
| 2002/0138476 A1 | 9/2002 | Suwa et al. | |
| 2002/0158129 A1 * | 10/2002 | Hu | 235/462.11 |
| 2003/0070139 A1 * | 4/2003 | Marshall et al. | 715/512 |

(Continued)

FOREIGN PATENT DOCUMENTS

DE    101 05 951 A1    9/2001

OTHER PUBLICATIONS

Abowd et al. "Building a Digital Library of Captured Educational Experiences," Kyoto International Conference on Digital Libraries 2000 pp. 395-402 (2000).

(Continued)

*Primary Examiner*—Cesar B Paula
(74) *Attorney, Agent, or Firm*—Townsend & Townsend & Crew LLP

(57) ABSTRACT

Techniques for generating a paper document that integrates notes written by a user and different types of captured or recorded information. A user can take written notes during an information communication event. While taking the notes, the user can identify, from information captured during the information communication event, information that is of interest to the user and that the user would like to integrate with or incorporate into the user's notes. A paper document is generated by printing a visual representation of the notes written by the user and the visual representations of portions of information that a user would like to integrate with the user's notes.

46 Claims, 12 Drawing Sheets

U.S. PATENT DOCUMENTS

2004/0194021 A1* 9/2004 Marshall et al. ............. 715/512

OTHER PUBLICATIONS

Brotherton et al. "Automated Capture, Integration, and Visualization of Multiple Media Streams.," Proc. IEEE Conference on Multimedia and Computing Systems pp. 54-63 (1998).

Chiu et al. "NoteLook: Taking notes in meetings with digital video and ink," Proceedings of ACM Multimedia '99. ACM, New York, pp. 149-158 (1999).

Landay et al. "Making sharing pervasive: Ubiquitous computing for shared note taking," IBM Systems Journal 38:531-550 (1999).

Pimentel et al. "Linking by Interacting: A Paradigm for Authoring Hypertext," Proceedings of Hypertext 2000, Austin, TX, 2000, pp. 39-48 (2000).

Schilit et al. "As We May Read: The Reading Appliance Revolution," Computer 32:65-73 (1999).

Stifelman et al. "The audio notebook: paper and pen interaction with structured speech," Proceedings of the SIG-CHI on Human factors in computing systems, 2001, pp. 182-189 (2001).

Truong et al. "Personalizing the Capture of Public Experiences," Personalizing the Capture of Public Experiences, Proc. User Interface and Software Technology Symposium (UIST'99) pp. 121-130 (1999).

Weber et al. "Marquee: A Tool for RealTime Video Logging," Proc. CHI 94 Human Factors in Computing Systems, ACM Press, New York, pp. 58-64 (1994).

Whittaker et al. "Filochat: handwritten notes provide access to recorded conversations," In Proceedings of CHI94 Conference on Computer Human Interaction, pp. 271-277, New York, ACM Press (1994).

Wilcox et al. "Dynomite: a dynamically organized ink and audio notebook," Proceedings of CHI'97 ACM, pp. 186-193 (1997).

* cited by examiner

GENERATING AUGMENTED NOTES AND SYNCHRONIZING NOTES AND DOCUMENT PORTIONS BASED ON TIMING INFORMATION

BACKGROUND OF THE INVENTION

The present invention relates to note-taking and more particularly to techniques for integrating various types of captured or recorded information with notes taken by a user.

Note-taking is one of the most prevalent forms of capturing information. Although there are several devices such as personal digital assistants (PDAs), laptops, etc. that are presently available for taking notes, most users still prefer to take notes on a paper medium such as a paper notebook using a marking device such as a pen or pencil. The act of note-taking is performed in several different environments including in a classroom, during a presentation, during a meeting, etc. For example, a meeting attendee may use a pen or pencil to take notes on a piece of paper to capture information presented at the meeting, a college student may take notes to capture information taught by a professor during a lecture, and the like.

The act of note-taking generally involves several functions that are performed by the note-taker. These functions include capture of the information, filtering of the information, and organization of the information. The note-taker captures a piece of information by writing it down in its entirety on the paper, or by writing down a few words that serve as a reminder or indicator of the piece of information that is of interest to the note-taker. The note-taker filters the information by only writing down parts of the information that are important to the note-taker. Finally, the notes allow the note-taker to organize the information in a manner that is personally meaningful to the note-taker.

During an information communication event such as a meeting, a lecture, a presentation, etc., information of various types may be output from one or more sources. For example, at a presentation, the information communicated may include audio information spoken by a presenter or any other attendee, audio information output by an audio output device such as a speaker, a television, etc., slides information (e.g., slides presented using Microsoft Powerpoint application), images (e.g., photographs, etc.) presented on a computer display or a screen, information written on a white board ("white board information"), video information output using a video output device such as a television, movie projector, etc., and other types of information. A person attending the presentation may take notes to capture information output by one or more of the sources. The person may be interested in capturing information at different levels of detail. For example, the person may want to capture an exact quote spoken by a presenter, or capture a slide shown on a screen, capture a figure drawn on the whiteboard, etc.

As stated above, in most instances, a person captures information during an information communication event by taking notes on a paper medium (e.g., a paper notepad) using a marking device such as a pen or pencil. In such a scenario, the level of detail of the information that the person can capture generally depends on the person's writing speed. In many instances, the person (i.e., the note-taker) may not have enough time to capture the desired information. For example, the note-taker may be able to copy only a portion of a slide before the information communication event has moved on to the next slide. Further, while copying the slide information, the note-taker may be distracted from the meeting itself and may consequently miss out on other important information communicated at the information communication event. As a result, the note-taker may not be able to capture the information that the note-taker desires to capture. Errors may also be introduced in the notes.

Meeting capture technology is designed to alleviate some of the problems faced by the note-taker. Conventional meeting capture technology provides the capability to capture various types of information communicated at an information communication event such as a meeting. For example, audio information, video information, image information, white board information, slides information, and other types of information communicated at a meeting can be captured and made available to interested users after the information communication event. However, conventional meeting capture technology does not allow a note-taker to filter, identify, or organize the captured information during the information communication event. The note-taker typically has to spend several hours after the information communication event has finished browsing through the captured information and identifying portions of the captured information that are of interest to the user. Additionally, conventional meeting capture technology does not provide a way for the note-taker to link the captured information of interest to the note-taker with the notes taken by the note-taker during the information communication event.

Accordingly, improved note-taking techniques are needed.

BRIEF SUMMARY OF THE INVENTION

Embodiments of the present invention provide techniques for generating a paper document that integrates notes written by a user and different types of captured or recorded information. According to an embodiment of the present invention, a user can take written notes during an information communication event. While taking the notes, the user can identify, from information captured during the information communication event, information that a user would like to integrate with or incorporate into the user's notes. A paper document is generated by printing a visual representation of the notes written by the user and the visual representations of portions of information that a user would like to integrate with the user's notes.

According to an embodiment of the present invention, techniques are provided for generating a paper document based upon information written by a user on a paper page and upon information captured by an information capture device. In this embodiment, information representative of the information written by the user on the paper page is accessed. The accessed information includes information representative of notes written by the user on the paper page. A portion of information from information captured by the information capture device is then determined. A visual representation is generated for the portion of information. A paper document is generated by printing the visual representation of the notes written by the user and the visual representation generated for the portion of information on one or more paper pages.

The foregoing, together with other features, embodiments, and advantages of the present invention, will become more apparent when referring to the following specification, claims, and accompanying drawings.

DETAILED DESCRIPTION OF THE INVENTION

Figure 1A:
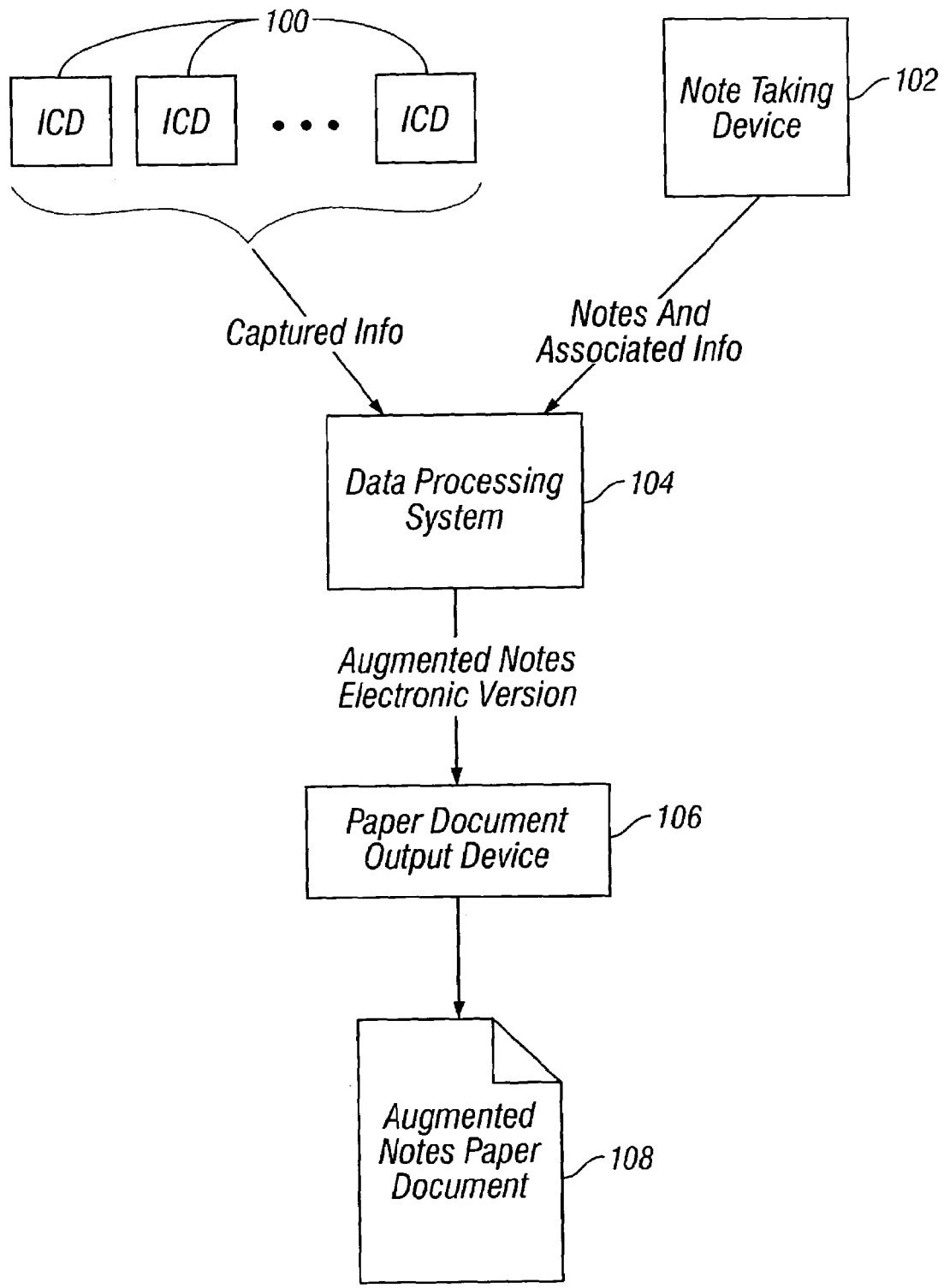
FIGS. 1A and 1B depict examples of simplified embodiments of the present invention.

Embodiments of the present invention provide techniques for generating a paper document that integrates notes written by a user and different types of captured or recorded information. According to an embodiment of the present invention, a user can take written notes during an information communication event. While taking the notes, the user can identify, from information captured during the information communication event, information that is of interest to the user and that the user would like to integrate with or incorporate into the user's notes. A paper document is generated by printing a visual representation of the notes written by the user and the visual representations of portions of information that a user would like to integrate with the user's notes.

According to an embodiment of the present invention a printable augmented electronic version of the notes is generated that integrates the user's written notes and representations of the information requested by the user to be integrated with the user's notes. The augmented electronic notes version can be printed on a paper medium to generate an augmented notes paper document that comprises a visual representation of the user's written notes and visual representations of the information identified by the user to be integrated with the user's notes.

For purposes of this application, the term "information communication event" is intended to include any event or period of time during which information of one or more types is communicated. Examples of information communication events include a meeting, a presentation, a lecture, a conference, a group of meetings, etc. The types of information that are communicated during an information communication event may include audio information, video information, slides information, whiteboard information, image information, and other types of information. An information communication event need not be contiguous in time and can be spread out over non-contiguous time periods. For example, a presentation may be spread out over several days and may be interspersed by other information communication events or other events. An information communication event may also represent one or more information communication events.

Various types of information communicated during an information communication event may be captured or recorded. For example, information captured during an information communication event may include audio information, video information, image information, whiteboard information, slides information, and other types of information. One or more devices ("information capture devices") may be used to capture the information. For purposes of this application, the terms "captured" and "recorded" are used synonymously.

The user may identify one or more types of the captured information to be integrated or incorporated into the notes written by the user during the information communication event. According to an embodiment of the present invention, visual representations (also called "static visual representations") are generated for portions of information to be integrated with the user's notes. A static visual representation or visual representation for a portion of information is a representation of the portion of information that can be printed on a paper medium or paper page. An augmented printable notes electronic version is generated that includes the static visual representations and a representation of the user's written notes. The augmented notes electronic version may be generated in various formats such as an image file, a PDF file, etc. that can be printed on paper. In other embodiments, the augmented notes electronic version may also be generated in the form of a web page, etc. that can be printed on paper. In this embodiment, a user may be allowed to interact with the augmented notes electronic version. The augmented notes paper document is generated by printing the augmented electronic version on a paper medium. Accordingly, the augmented notes paper document comprises visual representations of the information types identified by the user in the notes integrated with a visual representation of the user's notes.

As described above, the augmented notes paper document is generated by printing the augmented electronic version of the notes on a paper medium. The term "paper" or "paper page" as used in this application is intended to refer to any physical tangible medium on which information may be printed, written, drawn, imprinted, embossed, etc. The term "paper document" is intended to refer to a physical document comprising one or more paper pages. For purposes of this application, the term "printing" is intended to include printing, writing, drawing, imprinting, embossing, and the like.

Figure 1B:
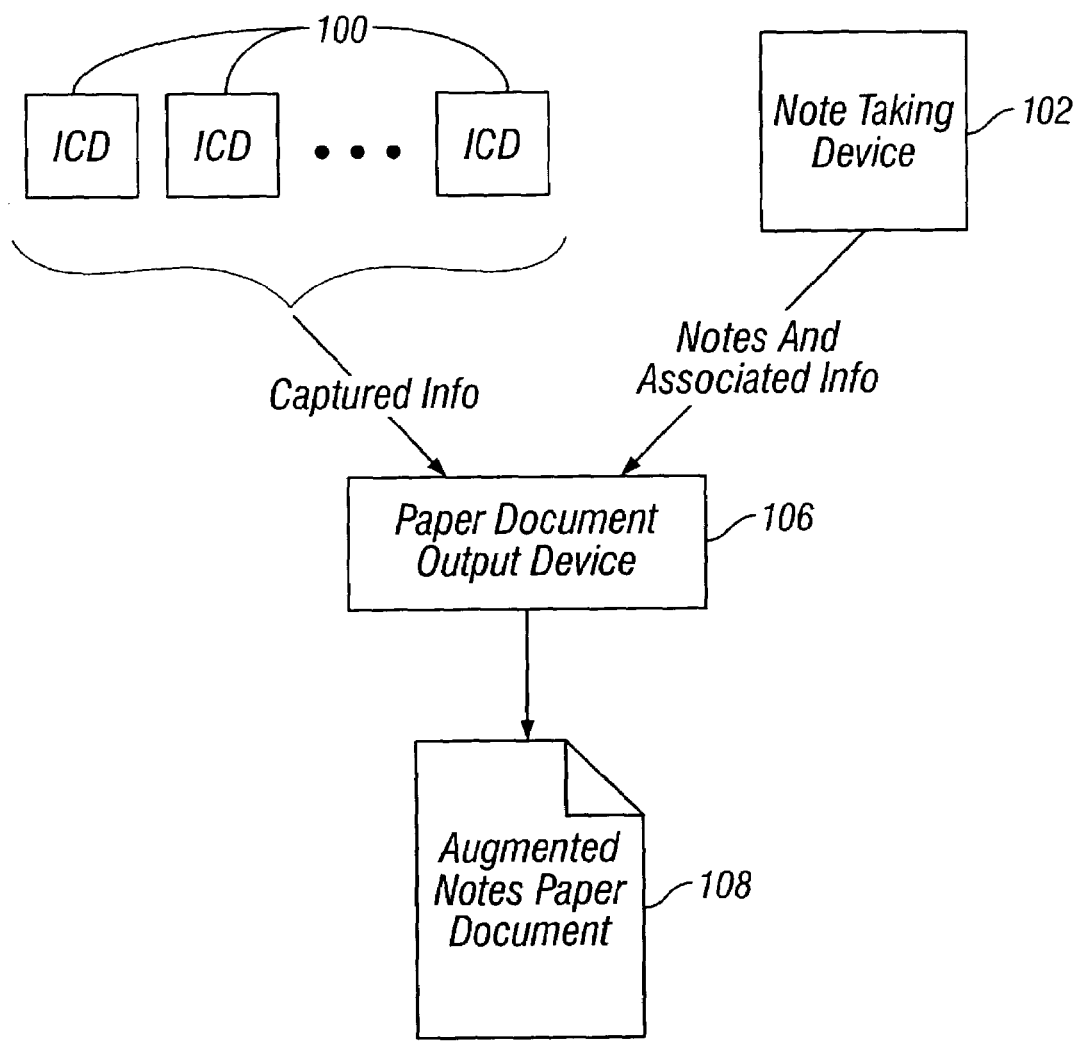

FIGS. 1A and 1B depict examples of simplified embodiments of the present invention. The embodiments depicted in FIGS. 1A and 1B are merely illustrative of embodiments of the present invention and do not limit the scope of the present invention as recited in the claims. One of ordinary skill in the art would recognize other variations, modifications, and alternatives.

The embodiment depicted in FIG. 1A includes one or more information capture devices (ICDs) 100, a note taking device 102, a data processing system 104, and a paper document output device 106. Information capture devices 100 are configured to capture (or record) information during an information communication event. For example, information capture devices 100 may be configured to capture information during a meeting, a presentation, a lecture, and the like. Each information capture device 100 may be configured to capture information of one or more types. Further, multiple information capture devices 100 may be provided for capturing information of a particular type. Information capture devices 100 may include audio information capture devices, video information capture devices, image information capture devices, slide information capture devices, whiteboard information capture devices, machine sensors configured to captured information of various types, and the like.

For purposes of this application, the term "capture device" or "information capture device" is intended to refer to any device, system, apparatus, or application that is configured to capture or record information of one or more types. Examples of information capture devices 100 that can capture audio information include microphones of various types, a video camera, and various other audio capture devices. Examples of information capture devices 100 that can capture video information include a video camera, and various other video capture devices. Examples of information capture devices 100 that can capture image information include video cameras that are configured to capture images, cameras of various kinds, and various other image capture devices. Whiteboard information capture devices may include devices such as a camera appropriately positioned to capture contents of the whiteboard, an apparatus that is configured to scan the whiteboard to capture its contents, and various other whiteboard capture devices. Slides information capture devices include cameras that can capture images of the slides, devices that can tap into the slides presentation application and capture the slides information, and other types of devices. Machine sensors may include sensors such as a heart monitor configured to capture heartbeat information, a pressure gauge configured to capture pressure changes, a temperature sensor configured to capture changes in temperature, and the like. Various other types of information capture devices 100 may also be provided to capture other types of information that may be output during an information communication event.

An information capture device 100 may use various techniques to capture the information. For example, a microphone is configured to capture audio information output by an information source such as a speaker, etc. An information capture device 100 may also be configured to capture information from an information source by tapping into the information source. For example, if the information source is a device or application that outputs a video stream (e.g., a television, a video or DVD player, a projector, etc.), a video information capture device may capture the video stream by tapping into the information source device or application.

In addition to capturing information of one or more types, according to an embodiment of the present invention, each information capture device 100 is configured to associate time information with the captured information or portions thereof. The time information approximately identifies the time when the information was captured by the information capture device 100. For example, if the information capture device 100 is a camera, the camera is able to timestamp each photograph or image captured by the camera. The timestamp (i.e., the time information) associated with a photograph or image indicates the time when the camera captured the information. As other examples, a video camera is able to timestamp audio and video information captured by the video camera during the information communication event. The time information associated with the captured information may be discrete (e.g., for a photograph) or may be continuous (e.g., for an audio or video stream).

To enable time-stamping of the captured information, an information capture device 100 may include an internal clock or timer that is used to determine when the information was captured. The internal clock of an information capture device 100 may be calibrated and synchronized with clocks of other information capture devices 100. Synchronization of the clocks of information capture devices 100 facilitates processing performed according to the teachings of the present invention as described below.

Information capture devices that are capable of time-stamping the captured information (i.e., associating time information with the captured information) are well known in the art and are accordingly not described in further detail in this application. The captured information along with the associated time information may be stored by the information capture device. According to an embodiment of the present invention, an information capture device 100 is configured to provide the captured information and the associated time information to data processing system 104 for further processing according to the teachings of the present invention. In other embodiments, an information capture device may store the captured information along with the time information in a memory location from where it can be accessed by data processing system 104.

During an information communication event, information capture devices 100 may capture information while the user is taking notes on a paper medium. According to an embodiment of the present invention, information capture devices 100 are configured to store information related to the user's notes along with the information captured by information capture devices 100. For a piece of captured information captured by an information capture device, information identifying a location in the user's notes ("location-in-notes information") at the time the piece of information was captured may be stored and associated with the captured piece of information. For example, when a whiteboard information capture device such as a camera captures an image of the whiteboard, information identifying the page on which the user is taking notes at the time of the capture may be stored along with the captured whiteboard image. For example, information such as "this whiteboard image was captured when the user was on page 3 of the notes" may be stored and associated with the captured image information.

An information capture device may receive the location-in-notes information from a sensor or reader (e.g., a page number barcode reader) that is able to read page information from the user's notes. A user may also provide the information manually to the capture device. For example, the capture device may provide a dial or button that a user may use to indicate location-in-notes information (e.g., page information) to the information capture device. The location-in-time information associated with a piece of captured information may be used to determine the page on which a static visual representation of the piece of captured information is to be placed (in this embodiment, timestamp information for the captured information may not be stored).

Information capture devices 100 may be appropriately placed in locations enabling capture of information during an information communication event. For example, during a meeting occurring in a conference room, information capture devices 100 may be located inside the conference room. If people from one or more remote locations are participating in the meeting, one or more of the capture devices may also be placed in the remote locations. Information capture devices 100 may also be placed outside the conference room. An information capture device 100 may also be carried by an attendee of the meeting, for example, a personal camera carried by an attendee, a personal tape recorder used by an attendee, and the like. According to an embodiment of the present invention, a user attending an information communication event may be able to control operations of one or more information capture devices 100 during an information communication event.

A user (sometimes referred to as the note-taker) can take notes using note taking device 102. According to an embodiment of the present invention, note taking device 102 provides a paper interface for the user to take notes. For example, note taking device 102 may provide paper pages that may be used by the user for taking notes. The user may take notes using a marking device such as a pencil, a pen, etc.

According to an embodiment of the present invention, note taking device 102 is configured to capture information written by a user on paper during an information communication event. The information captured by note taking device 102 may include the user's handwritten notes and other written information (e.g., marks made by the user, as described below). Note taking device 102 may store the captured written information in various formats including XML (Extendible Markup Language) format, image format, and the like. Note taking device 102 may be configured to capture and store written information for a single information communication event or may be configured to separately store captured information for multiple information communication events.

In an embodiment storing information for multiple information communication events, each information communication event may be identified by an identifier that may be assigned by note taking device 102 or specified by the user. In this embodiment, a user can specify an information communication event with which a particular set of captured written information is to be associated. As previously described, a particular information communication event may span non-contiguous time periods. For example, a first information communication event may be followed by a second information communication event which may be followed by the first information communication event. For example, a user may attend a first meeting, then attend a second meeting, and then go back to the first meeting. Notes taken by the user during the first meeting may be specified as belonging to a first information communication event and notes taken by the user during the second meeting may be specified as belonging to a second information communication event. An augmented notes paper document may be generated for each information communication event.

In embodiments wherein note taking device 102 is configured to store information for a single information communication event, all the notes taken by a user since the last time that an augmented notes paper document was generated are considered as being part of a single information communication event. After an augmented notes paper document is generated, subsequent notes are considered to be part of a new information communication event. In this embodiment, an augmented notes paper document is generated for the notes information stored by note taking device 102.

According to the teachings of the present invention, while taking notes during an information communication event, the user can indicate that information of one or more types captured during the information communication event is to be integrated with the user's written notes. A user may use various different techniques to indicate the type of information that is to be integrated with the user's notes.

According to an embodiment of the present invention, a user may use a marking device to make marks on the notes paper to indicate that information of a particular type is to be integrated with the user's notes. Note taking device 102 is configured to capture information related to the marks along with the user's handwritten notes. Accordingly, the handwritten information captured by note taking device 102 includes information representing the user's handwritten notes and information representative of one or more marks made by the user.

Note taking device 102 may store the captured written information, including the user's handwritten notes and marks information, in various formats. According to an embodiment of the present invention, note taking device 102 is configured to store the captured information in XML (Extendible Markup Language) format.

Using marks is just one way in which a user can indicate that captured information of a particular type is to be integrated with the user's handwritten notes. Various other techniques may also be used. According to an embodiment of the present invention, events or signals occurring during an information communication event may also be used to identify information of interest to the user that the user would like to incorporate into the user's notes. The events or signals may be triggered by the user or by some other entity or device. For example, a user may take a picture with a camera, or scan a barcode printed on a page used for taking notes, etc. Information related to the events or signals may be provided to and stored by note taking device 102 or by information capture devices 100.

Note taking device 102 or even the marking device used by the user may allow the user to generate the events or signals. For example, note taking device 102 or the marking device may provide one or more buttons for the various types of information. A button may be provided for video information, a button for audio information, a button for slides information, etc. While taking notes, a user may press a button to indicate that information corresponding to the button is to be integrated with the user's notes. Information identifying button presses/selections may be stored by note taking device 102. The stored information may identify the type of information corresponding to the button and the approximate time when the button was selected by the user. Information identifying a page used by the user when the button was selected may also be stored and used to generate the augmented notes paper document. Further information related to the use of events or signals is provided below.

According to an embodiment of the present invention, note taking device 102 is configured to associate time information with the captured information that includes the user's notes and other information (e.g., marks) written by the user. The time information (or time stamp) identifies a time when the information was written by the user. The granularity of the time information may vary in various embodiments of note taking device 102. For example, note taking device 102 may associate time information with a chunk of the written notes, a set of lines, a set of words, each word, each written stroke, etc.

To enable time-stamping of the captured written information, note taking device 102 generally includes an internal clock that is used to determine when the information was written by the user. The internal clock of note taking device 102 may be calibrated and synchronized with clocks of information capture devices 100. Synchronization of the clocks of information capture devices 100 and note taking device 102 facilitates processing performed according to the teachings of the present invention.

According to an embodiment of the present invention, note taking device 102 is configured to store information that uniquely identifies each page used for taking notes. According to an embodiment of the present invention, each paper page that is used for note-taking is uniquely identified. In embodiments where note taking device 102 can simultaneously store information for multiple user-identifiable information communication events, the pages may be uniquely identified for each information communication event.

For purposes of this application, the term "page information" is intended to refer to information that is used to uniquely identify a page used for note-taking. According to an embodiment of the present invention, page information for a paper page may be determined from information printed on the paper page. The information printed on a page and used for page information may include a page number, a barcode, a glyph, a label, etc. The information that is used as page information may be pre-printed on the pages before the pages are used for note-taking, or may be printed on the pages by either the user or by note taking device 102 while taking notes.

Note taking device 102 is configured to read the information printed on the pages. For example, note taking device 102 is configured to read a page number, a barcode, a label, a glyph, etc. printed on each paper page that is used for note-taking. Note taking device 102 may use the information read from a paper page as page information for the paper page. Alternatively, note taking device 102 may use the read information to derive page information for the paper page.

Various techniques may also be used for determining page information for a page. According to an embodiment of the present invention, the user may specify the page information for a page. For example, note taking device 102 may provide a push button allowing the user to specify page information (e.g., a page number) for a page currently used by the user for taking notes. Various imaging techniques may also be used. For example, an image of the paper page may be scanned and the image information may be used to identify the page. Conductive ink techniques such as those described in "Conductive Ink Based Page Detection for Linking Digital and Physical Pages" by Kim W. May, IBM Research Center, ACM SIGCHI 2001 Short Paper (incorporated herein by reference) may also be used to identify pages.

According to an embodiment of the present invention, the page information identifying a page is also associated with the written information captured by note taking device 102 and stored by note taking device 102. For example, according to an embodiment of the present invention, note taking device 102 associates page information with each stroke (or word, line, paragraph, etc.) of the handwritten information captured by note taking device 102. Accordingly, for each stroke (or word, line, paragraph, etc.) of the captured handwritten information, the page information associated with the stroke identifies a page on which the stroke was made by the user. According to an embodiment of the present invention, the page information is used for generating the augmented notes paper document.

According to an embodiment of the present invention, note taking device 102 is able to determine information ("position information") indicating the location of the captured handwritten information on pages used for note-taking. Position information may be determined for each stroke, word, line, paragraph, etc. of the handwritten information captured by note taking device 102. For example, position information may indicate the location on a page of each handwritten stroke captured by note taking device 102. The position information may be stored along with the handwritten information captured by note taking device 102. Accordingly, given the position information for a particular chunk (e.g., stroke, word, line, paragraph, section, etc.) of the written information captured by note taking device 102, the location of the particular chunk on a page can be determined. Further, given the page information for the particular chunk, a particular unique page on which the chunk is written can also be determined.

The granularity of the position information may vary in the various embodiments of the present invention. According to an embodiment of the present invention, each page used for taking notes may be divided into sections (e.g., quadrants) and the position information for a chunk (e.g., stroke, word, etc.) of the captured written information may identify the section (e.g., a particular quadrant) of the page in which the chunk is located. In other embodiments, the position information may be represented using horizontal (X) and vertical (Y) coordinates. The granularity may even be so large that position information for a chunk of captured written information is the same as the page information for the page. Various other techniques may also be used for specifying the position information for the notes.

Figure 2:
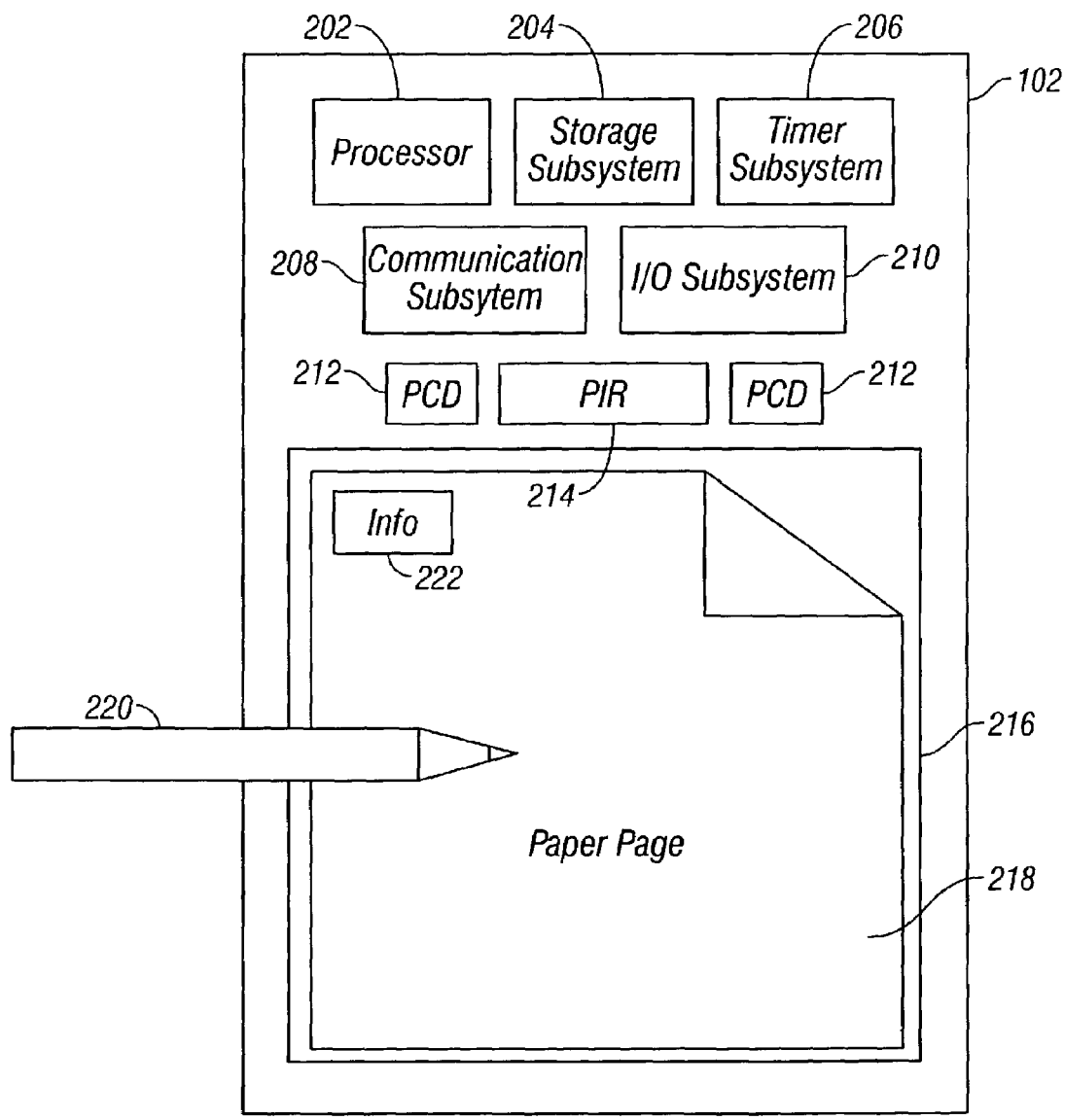
FIG. 2 depicts a simplified block diagram of a note taking device according to an embodiment of the present invention.

An example of a note taking device 102 is depicted in FIG. 2 and described below.

Referring back to FIG. 1A, data processing system 104 is configured to perform processing for generating a printable augmented notes electronic version based upon information captured and stored by note taking device 102 and based upon information captured by information capture devices 100. Accordingly, in order to generate the augmented notes electronic version, data processing system 104 accesses the information captured by note taking device 102 and information capture devices 100.

Various techniques may be used to enable data processing system 104 to access information from an information capture device 100. According to an embodiment of the present invention, an information capture device 100 may be connected to data processing system 104 via a communication link and information captured by the information capture device may be communicated to data processing system 104 via the communication link. The communication link may be of various types including a hardwire link, an optical link, a satellite or other wireless communication link, a wave propagation link, or any other mechanisms for communication of information. Various communication protocols may be used to facilitate communication of information via the communication link. These communication protocols may include TCP/IP, HTTP protocols, extensible markup language (XML), wireless application protocol (WAP), protocols under development by industry standard organizations, customized protocols, and others.

Information capture device 100 may also be coupled to data processing system 104 via a network and information captured by the information capture device may be communicated to data processing system 104 via the network. The network may be a local area network (LAN), a wide area network (WAN), a wireless network, an intranet, a private network, a public network, a switched network, the Internet, or any other suitable communication network.

An information capture device 100 may also be configured to store the captured information on a storage medium such as a floppy disk, CD, etc., and the storage medium may be provided to data processing system 104. In yet other embodiments, information capture devices 100 may be configured to store the captured information in a memory location accessible to data processing system 104. For example, an information capture device may store the captured information and associated information (e.g., associated time information) in a central database accessible to data processing system 104.

Data processing system 104 may access the information stored by note taking device 102 using various techniques. Note taking device 102 may be connected to data processing system 104 via a communication link or a network and information stored by note taking device 102 may be communicated to data processing system 104 via the communication link or network. In other embodiments, note taking device 102 may be configured to store the captured information on a storage medium such as a floppy disk, CD, etc., and the storage medium may be provided to data processing system 104. In yet other embodiments, note taking device 102 may be configured to store the information in a memory location (e.g., a central database) accessible to data processing system 104. Note taking device 102 may also be docked with data processing system 104 and data processing system 104 may access the information stored by note taking device 102 via the docking interface.

Data processing system 104 is configured to generate a printable electronic version of the notes (the augmented notes electronic version) that integrates the written notes and representations of information requested by the user to be integrated with the notes. According to an embodiment of the present invention, data processing system 104 generates static visual representations for the information identified by the user to be integrated with the user's notes. The augmented notes electronic version represents an integration of the static visual representations and a visual representation of the notes taken by the user.

Data processing system 104 may communicate the augmented notes electronic version to a paper document output device 106 that is capable of printing the augmented notes electronic version on a paper medium to generate an augmented notes paper document 108. Contents of the augmented notes paper document comprise visual representations of portions of information captured by one or more information capture devices 100 and identified by the user to be integrated with the user's written notes and a visual representation of the user's notes. Examples of paper document output device 106 include a printer or any other device capable of printing the augmented notes electronic version on a paper medium.

In the embodiment depicted in FIG. 1B, paper document output device 106 is able to perform the functions of data processing system 104 depicted in FIG. 1A. In this embodiment, the information captured by information capture devices 100 and note taking device 102 is provided to paper document output device 106. Various different techniques described above for providing information to data processing system 104 may also be used for providing information to paper document output device 106. In this embodiment, paper document output device 106 is configured to generate an augmented notes electronic version based upon the information received from information capture devices 100 and note taking device 102 and to generate an augmented notes paper document based upon the generated augmented notes electronic version.

FIG. 2 depicts a simplified block diagram of a note taking device 102 according to an embodiment of the present invention. Note taking device 102 depicted in FIG. 2 includes one or more processors 202, a storage subsystem 204, a timer subsystem 206, a communication subsystem 208, an input/output (I/O) subsystem 210, one or more position capture devices (PCDs) 212, and a page information reader (PIR) 214. Note taking device 102 provides a space 216 for receiving one or more paper pages 218 to be used for taking notes. Each paper page comprises information 222 that is used to uniquely identify that paper page. The information may be pre-printed on the paper, such as a barcode, a page number, etc. or may be written in by the note-taker. In the embodiment depicted in FIG. 2, a pen or pencil or some other marking device 220 may be used for taking notes. It should be understood that note taking device 102 depicted in FIG. 2 is merely illustrative in nature and is not meant to limit the scope of the present invention. One of ordinary skill in the art would recognize variations, modifications, and alternatives.

Processor 202 is configured to control the working of note taking device 102. Processor 202 is configured to execute programs and code modules that may be stored in storage subsystem 204. One or more processors may be provided.

Storage subsystem 204 is configured to store program and code modules that may be executed by processor 202. Storage subsystem 204 also serves as a repository for storing data and information that is generated or captured by note taking device 102. For example, handwritten information captured by note taking device 102 and the associated time information, position information, and page information may be stored in storage subsystem 204. Storage subsystem 204 may include a number of memories (volatile and non-volatile) including a random access memory (RAM) for storing instructions and data during program execution and a read only memory (ROM) for storing fixed instructions. Storage subsystem 204 may also include persistent (non-volatile) storage such as a hard disk drive, a floppy disk drive along with associated removable storage media, a CD or DVD drive along with associated removable storage media, an optical drive, removable media cartridges, and other like storage media.

Communication subsystem 208 is configured to facilitate communication of information from and to note taking device 102. According to an embodiment of the present invention, communication subsystem 208 provides an interface for communicating information stored by note taking device 102 to another device or computer system such as data processing system 104 depicted in FIG. 1A or paper document output device 106 depicted in FIG. 11B. Communication subsystem 208 may provide a communication interface such as a docking port, a wireless communication interface, a wired communication interface, and the like to facilitate communication of information.

I/O subsystem 210 allows a user of note taking device 102 to enter information into or provide information to note taking device 102. Note taking device 102 may output information using I/O subsystem 210.

As described above, a pen or pencil or some other marking device 220 may be used for taking notes. According to an embodiment of the present invention, to facilitate capture of written information, marking device 220 includes an ultrasound transmitter that is configured to send out an ultrasound signal when marking device 220 is used to write on paper 218. In one embodiment, the ultrasound sound transmitter is placed in the nib of a pen and is configured to send out an ultrasound signal whenever the nib is pressed against the paper.

Position capture devices (PCDs) 212 are configured to capture position information for information written by the user on paper 218 using marking device 220. In some embodiments, position capture devices 212 may also be configured to capture the information written on pager 218 by the user. In an embodiment where marking device 220 includes an ultrasound transmitter, position capture devices 212 may include ultrasound receivers that are configured to pick up the ultrasound signal transmitted by marking device 220 when marking device 220 is used to write on paper. Based upon factors such as the speed of sound and using triangulation techniques, position capture devices 212 are configured to determine the position of the pen and consequently the position of a written stroke on paper page 218. The position information determined by position capture devices 212 may be associated with the handwritten information captured by note taking device 102 and stored in storage subsystem 204.

As stated above, according to an embodiment of the present invention, position capture devices 212 are also configured to capture the information written on page 218. For example, position capture devices 212 are configured to capture the notes written by the user using marking device 220. In this embodiment, the position and movement of marking device 220 is captured by position capture devices 212 and used to identify the notes written by the user.

Several other techniques may also be used to capture the information written by a user on paper 218. In one embodiment, space 216 of note taking device 102 includes a special surface (e.g., a touch screen surface) that is able to capture notes written by a user on a paper page 218 placed on space 216. In another embodiment, note taking device 102 may provide a scanning or reader mechanism for scanning or reading information written by a user on the paper pages. Various other techniques may also be used.

Timer subsystem 206 is configured to provide time information that is used to timestamp the information captured by note taking device 102. Timer subsystem 206 may be calibrated and synchronized with timers of other information capture devices 100 to facilitate generation of an augmented notes paper document according to the teachings of the present invention. The time information may be associated with the captured notes information and stored in storage subsystem 204.

For a paper page 218 placed in space 216, page information reader 214 is configured to read information 222 from the paper page that is used to uniquely identify the page. As previously stated, information 222 may include a page number, a bar code, a glyph, etc. The information read by page information reader 214 is used to determine page information for the paper page. The page information determined for the page may be associated with the captured written information and stored in storage subsystem 204.

Note taking device 102 can be of various types having more or fewer components than the embodiment depicted in FIG. 2. Examples of note taking device 102 include the dPad manufactured by Ricoh Corporation, Japan, the Anoto® Pen manufactured by Anoto Corp., and the InkLink™ Handwriting System manufactured by Seiko Instruments USA Inc.

As previously stated, according to the teachings of the present invention, while taking notes during an information communication event, a user can indicate one or more types of information captured during the communication event that the user would like to integrate with the user's notes. Various different techniques may be provided that allow the user to indicate information to be integrated with the user's notes.

According to an embodiment of the present invention, the user may make a mark on the notes paper to indicate that captured information of a particular type is to be integrated with the user's notes. The mark may also identify the location in the notes where the information of the particular type is to be integrated. The user may use a marking device (e.g., a pen, a pencil, etc.) to make the mark.

According to one embodiment, the mark itself may identify information of a particular type to be integrated with the user's notes. In this embodiment, special pre-defined characters, letters, symbols, graphics, etc., or combinations thereof may be used to denote a mark. The type of information that the user would like to integrate with the user's notes may be determined from the identity of the mark. For example, a special symbol (e.g., a "V" in a circle) may be defined as a mark to indicate video information, a second symbol (e.g., an "A" in a circle) may be defined as a mark to indicate audio information, a third symbol (e.g., a "W" in a circle) may be defined as a mark to indicate whiteboard information, a fourth symbol (e.g., an "I" in a circle) may be defined as a mark to indicate image information, and so on. Accordingly, in this embodiment, the identity of the mark identifies the type of information. Various types of marks may be used in accordance with the teachings of the present invention. In this embodiment, the marks may be placed anywhere on the pages used for taking notes.

As described above, note taking device 102 is configured to capture handwritten information that includes information identifying the mark. Note taking device 102 identifies marks from the captured information by parsing the captured written information to locate occurrences of special symbols, characters, etc. that signify marks. Note taking device 102 is also configured to determine and store time information, page information, and position information for the captured written notes (as described above). Accordingly, for each mark, note taking device 102 determines time information indicating when the special mark was made, page information indicating on which page the mark was made, and position information indicating the location of the mark on a page. As described below, the time, position, and page information associated with a mark is used to generate the augmented notes electronic version.

According to another embodiment of the present invention, the location of a mark on a page may be used to indicate captured information of a particular type that the user would like to integrate with the user's written notes. In this embodiment, pre-defined special or reserved areas may be pre-printed on each page that is used for taking notes. Each special area may correspond to a particular type of information captured by information capture devices 100 during an information communication event. For example, a first set of one or more special areas may be pre-printed on a page corresponding to video information, a second set of one or more special areas may be pre-printed on a page corresponding to audio information, a third set of one or more special areas may be pre-printed on a page corresponding to image information, a fourth set of one or more special areas may be pre-printed on a page corresponding to whiteboard information, a fifth set of one or more special areas may be pre-printed on a page corresponding to slides information, and so on. In this embodiment, while taking notes, the user may make a mark in a particular special area of the page to indicate that information of the type corresponding to the particular area marked by the user is to be incorporated into the user's notes. Accordingly, in this embodiment, the position of a mark on a page used for note-taking identifies the type of information of interest to the user and that the user would like to integrate with the notes. In this embodiment, the identity of the mark is not important—any type of mark may be used.

As described above, note taking device 102 is configured to capture and store position information for the captured written information that includes marks written by the user. By knowing the locations of special areas on a page and based upon the position information associated with the captured written information, note taking device 102 is able to determine occurrences of one or more marks made in one or more special areas of the page. Based upon the time information associated with the mark, note taking device 102 is able to determine when the mark was made in the special area. The page information associated with the mark identifies the page on which the mark was made. The time, position, and page information associated with a mark is used to generate the augmented notes electronic version.

There are various ways in which information identifying location of special areas on a page is provided to note taking device 102. According to an embodiment of the present invention, a template of the pages used for note-taking may be provided to note taking device 102. The template identifies locations of special areas on a page. For each special area, the template information may also identify the type of information corresponding to the special area. Note taking device 102 uses the template information to identify locations of special areas on a page, and to determine the type of information corresponding to the special areas.

In some embodiments, the template information may be provided to data processing system 104 (or paper document output device 106) instead of note taking device 102. In this embodiment, data processing system 104 (or paper document output device 106) may use the template information to determine if the notes captured by note taking device 102 include marks made in special areas as defined by the template information. Data processing system 104 may also use the template information to identify the type of information corresponding to each mark made in a special area.

It should be understood that combinations of special marks (e.g., special symbols, etc.) and marks made in special areas of a page may be used in embodiments of the present invention to identify information that the user would like to integrate with the user's notes.

Figure 3:
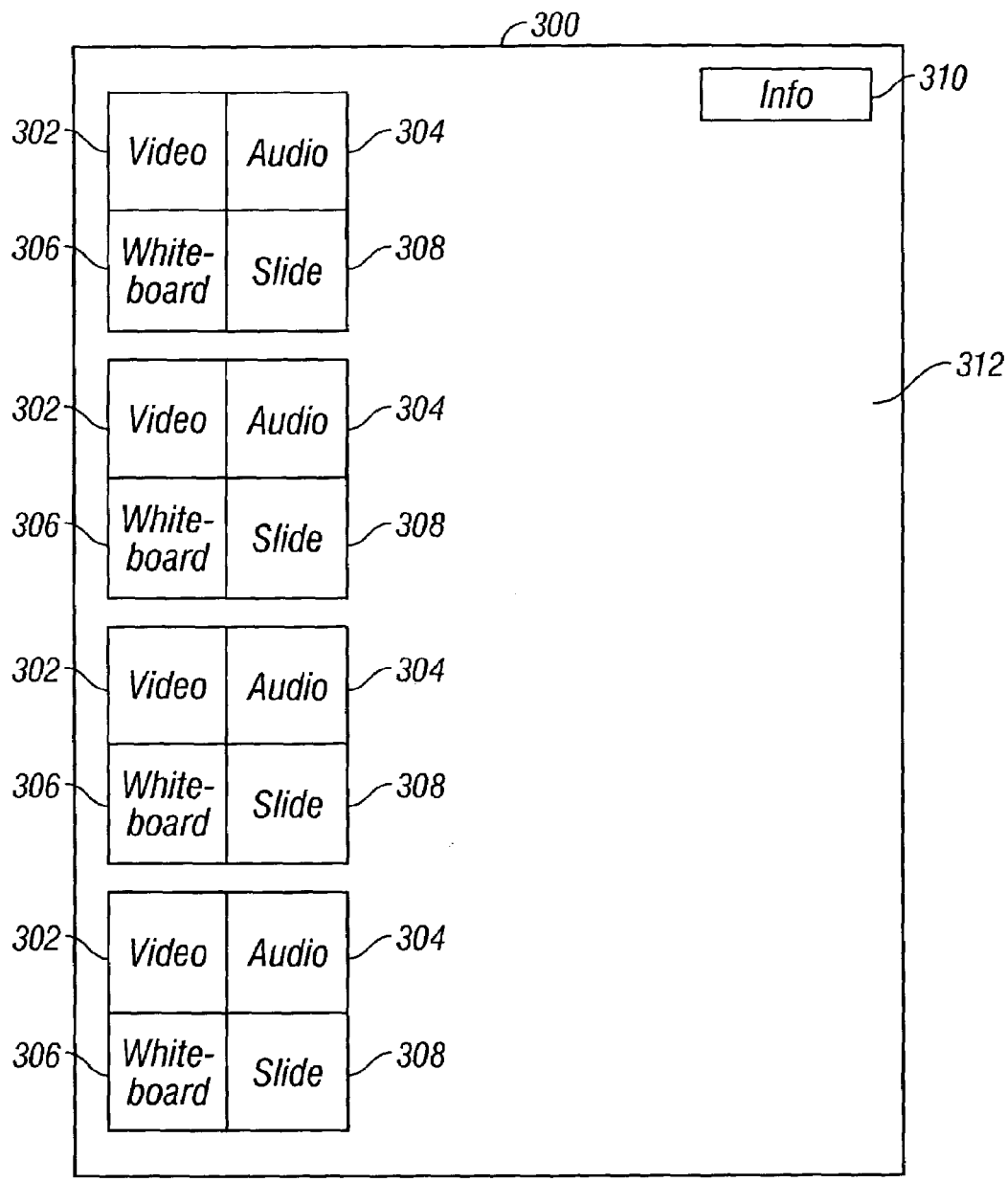
FIG. 3 depicts an example of a paper page that can be used for taking notes according to an embodiment of the present invention.

FIG. 3 depicts an example of a paper page 300 that can be used for taking notes according to an embodiment of the present invention. Page 300 comprises a number of special areas 302, 304, 306, and 308 that may be used by a user to indicate information of a particular type to be incorporated into the user's notes. It should be understood that page 300 depicted in FIG. 3 is merely illustrative of a paper page that may be used to take notes according to the teachings of the present invention and is not meant to limit the scope of the present invention as recited in the claims. One of ordinary skill in the art would recognize other variations, modifications, and alternatives.

As depicted in FIG. 3, a plurality of special areas are pre-printed on page 300. Page 300 also includes space 312 where the user can take written notes. Areas 302 correspond to video information. Accordingly, a user (note-taker) can make a mark (e.g., a tick mark, or any other mark) in an area 302 to indicate that the user is interested in the captured video information. Areas 304 correspond to audio information. A user taking notes can make a mark in an area 304 to indicate that the user is interested in the captured audio information. Areas 306 correspond to whiteboard information. A user taking notes can make a mark in an area 306 to indicate that the user is interested in the captured whiteboard information. Areas 308 correspond to slides information. A user taking notes can make a mark in an area 308 to indicate that the user is interested in the captured slides information.

Additional special areas corresponding to other types of information captured during an information communication event may also be included in alternative embodiments of the present invention. The arrangement of the special areas may also vary in alternative embodiments of the present invention. Information 310 (e.g., page number, barcode, etc.) that is used to uniquely identify page 300 is also printed on page 300. A template representing the arrangement of the special areas depicted in FIG. 3 may be provided to note taking device 102 and/or to data processing system 104 to enable them to determine if any marks have been made in the special areas and to determine the type of information corresponding to the marks.

In the embodiments described above, the identity of the marks (e.g., a special symbol, character, etc.) or the location of marks in special areas of a page are used to identify the type of information that the user would like to incorporate in the user's notes. In alternative embodiments, instead of identifying the type of information, the identity or location of marks may be used to identify a source of information such as an information capture device that is used to capture the information of interest. In this embodiment, a special mark or a mark made in a special area of a page may identify a particular information capture device and indicate that a portion of information captured by that particular information capture device is to be incorporated into the user's notes. In this embodiment, a special mark placed in the notes may identify a particular capture device (e.g., a camera, a video camera, a microphone, etc.). In embodiments that use pages having special areas, each special area may correspond to a particular capture device and the user may identify a particular capture device by placing a mark in the special area corresponding to the capture device.

Figure 4:
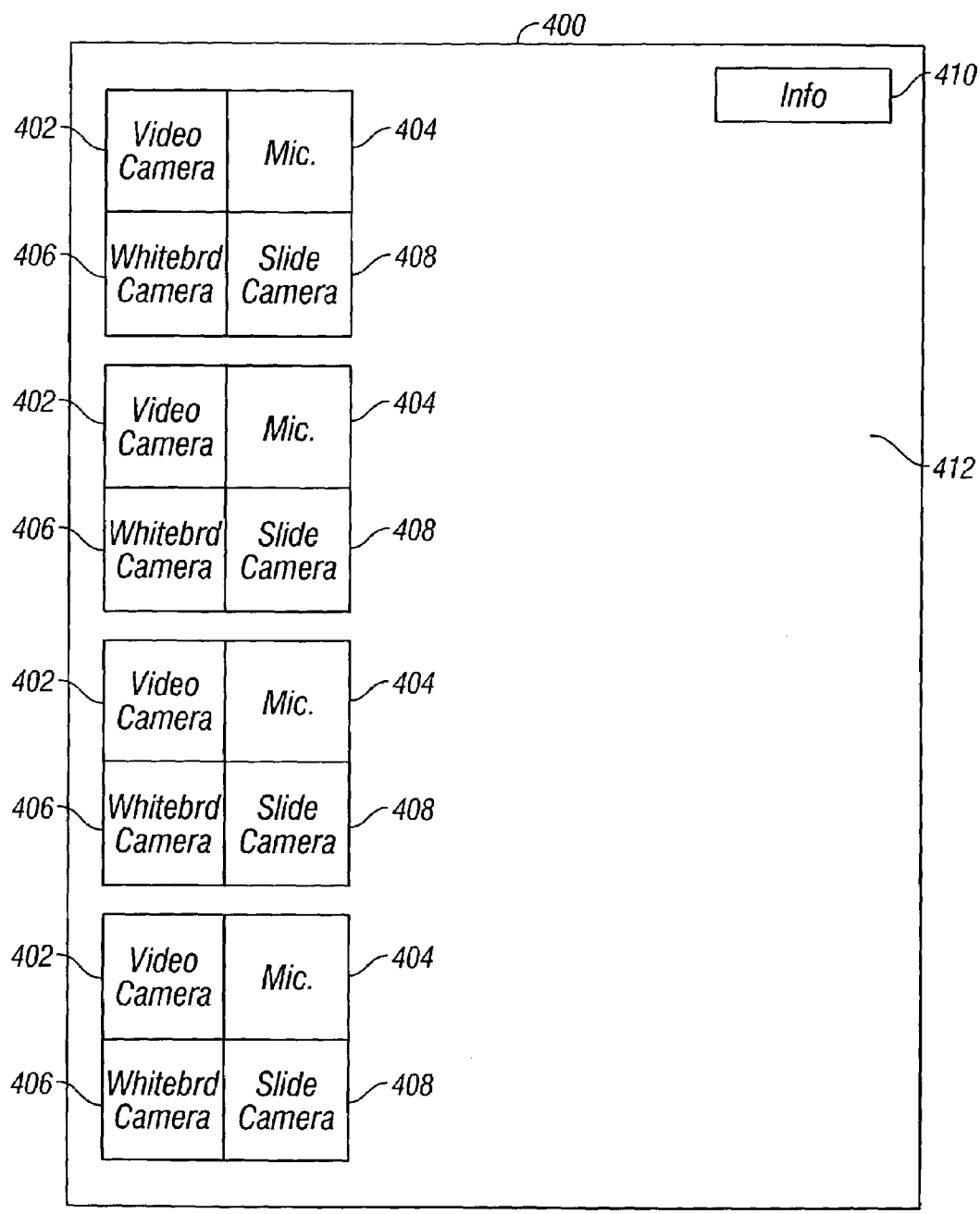
FIG. 4 depicts another example of a paper page that can be used for taking notes according to an embodiment of the present invention.

For example, FIG. 4 depicts an example of a paper page 400 that can be used for taking notes according to an embodiment of the present invention. Page 400 comprises a plurality of special areas 402, 404, 406, and 408 corresponding to capture devices. It should be understood that page 400 depicted in FIG. 4 is merely illustrative of a paper page that may be used to take notes according to the teachings of the present invention and is not meant to limit the scope of the present invention as recited in the claims. One of ordinary skill in the art would recognize other variations, modifications, and alternatives.

Areas 402 correspond to a video camera. Accordingly, a user (note-taker) can make a mark (e.g., a tick mark, or any other mark) in an area 402 to indicate that the user is interested in information captured by the video camera. Areas 404 correspond to a microphone. A user taking notes can make a mark in an area 404 to indicate that the user is interested in the audio information captured by the microphone. Areas 406 correspond to a camera placed in front of a whiteboard and used to capture whiteboard information. A user taking notes can make a mark in an area 406 to indicate that the user is interested in whiteboard images captured by the camera. Areas 408 correspond to a camera used to capture slides information. A user taking notes can make a mark in an area 408 to indicate that the user is interested in images of slides captured by the camera.

Additional special areas corresponding to other types of capture devices may also be provided on page 400. The arrangement of the special areas may also vary in alternative embodiments of the present invention. Information 410 (e.g., page number, barcode, etc.) that is used to uniquely identify page 400 is also printed on page 400. A template representing the arrangement of the special areas depicted in FIG. 4 may be provided to note taking device 102 and/or to data processing system 104 to enable them to determine if any marks have been made in the special areas and to determine the capture device corresponding to each mark.

It should be understood that a combination of marks that identify a type of information and marks that identify a particular capture device or information source may be used according to the teachings of the present invention.

Figure 5A:
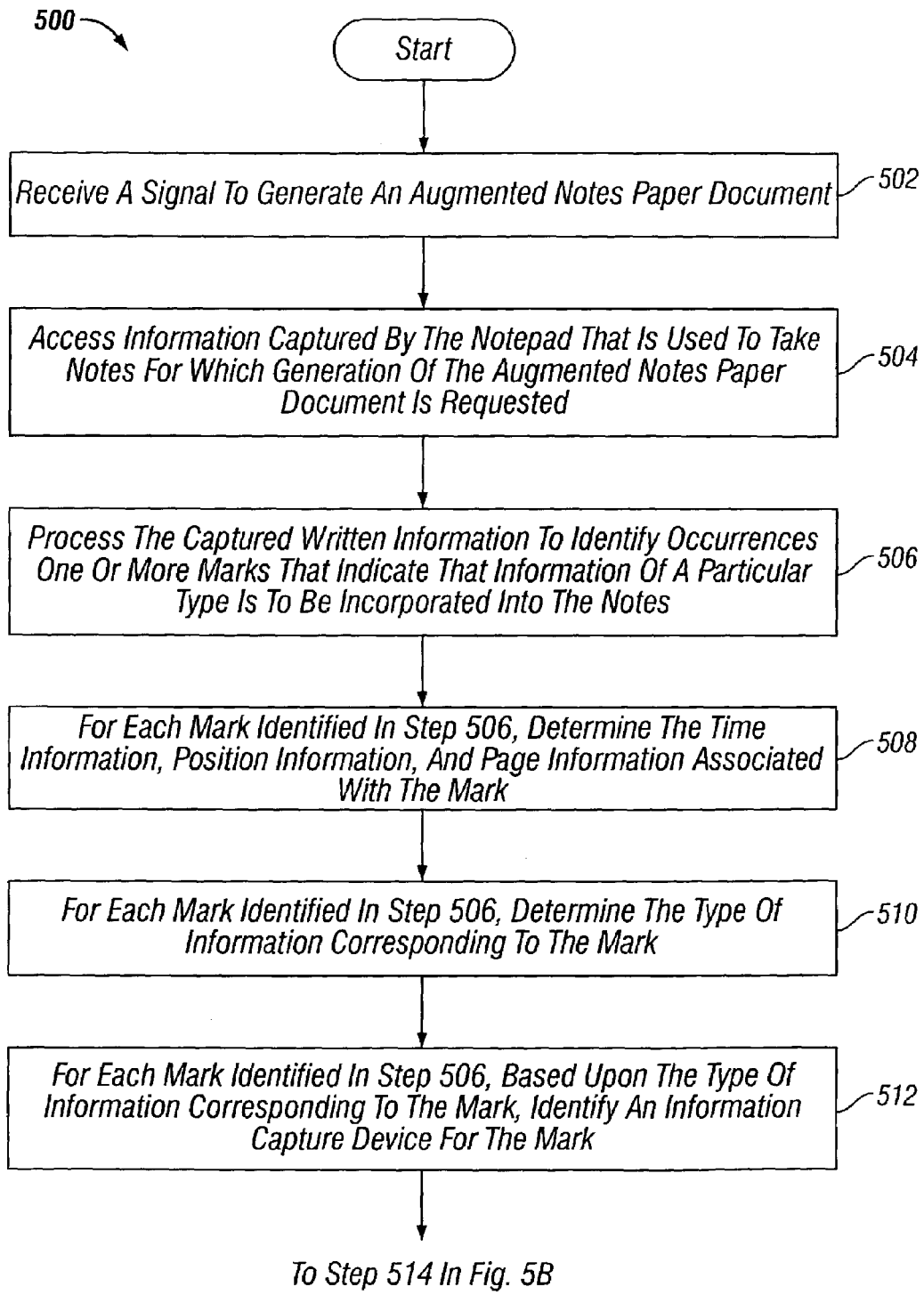
FIGS. 5A and 5B depict a simplified high-level flowchart depicting a method of generating an augmented notes paper document according to an embodiment of the present invention.
Figure 5B:
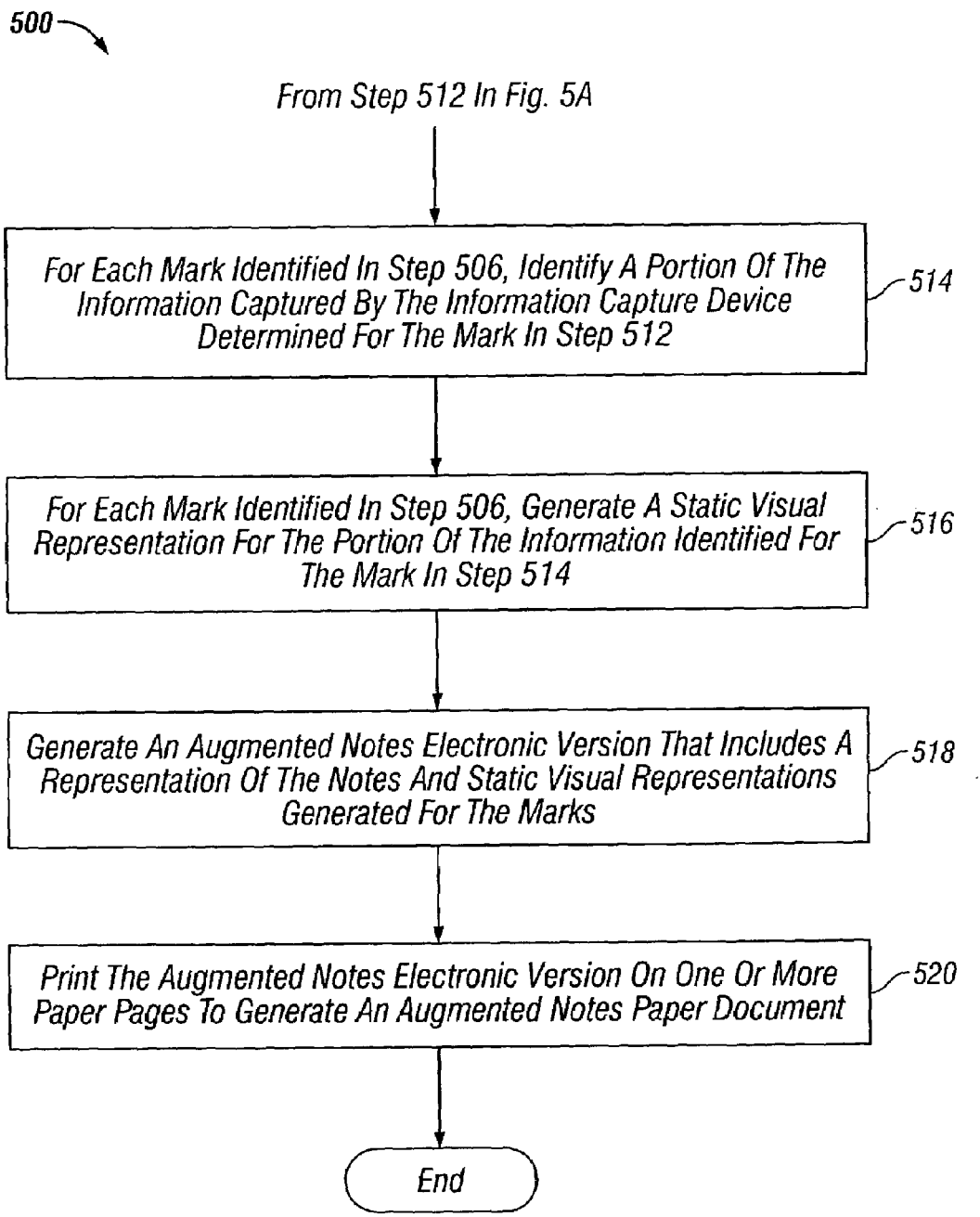

FIGS. 5A and 5B depict a simplified high-level flowchart 500 depicting a method of generating an augmented notes paper document according to an embodiment of the present invention. The method may be performed by software modules executed by data processing system 104, by hardware modules of data processing system 104, or combinations thereof. In alternative embodiments (e.g., the embodiment depicted in FIG. 1B), the method depicted in FIGS. 5A and 5B may be performed by software modules executed by paper document output device 106, by hardware modules of paper document output device 106, or combinations thereof. In alternative embodiments, the processing may be performed by data processing system 104 in association with paper document output device 106. The description below assumes that the processing is performed by data processing system 104. This is however not intended to limit the scope of the present invention as recited in the claims. Flowchart 500 depicted in FIG. 5 is merely illustrative of an embodiment incorporating the present invention and does not limit the scope of the invention as recited in the claims. One of ordinary skill in the art would recognize variations, modifications, and alternatives.

As depicted in FIG. 5A, processing is initiated when data processing system 104 receives a signal to generate an augmented notes paper document (step 502). The signal may be received via a user interface (e.g., a user interface screen, an input button, etc.) provided by data processing system 104. In embodiments of the present invention in which note taking device 102 can simultaneously store information for multiple information communication events, the signal received in step 502 may identify a particular information communication event for which the augmented notes paper document is to be generated. The signal received in step 502 may also identify a note taking device 102 that is used for taking notes for which an augmented notes paper document is to be generated.

Upon receiving the signal, data processing system 104 accesses information captured by a note taking device 102 that is used to take notes for which generation of the augmented notes paper document is requested (step 504). As previously described, data processing system 104 may access the information from the note taking device 102 in several different ways including via a communication link, via a network, via a docking interface if the note taking device 102 is docked with the data processing system 104, from a central database where the information is stored, etc. The information accessed in step 504 includes information representative of written information and other associated information captured by note taking device 102 The written information may include notes taken by a user during an information communication event and other notes. The written information may include one or more marks made by the user during an information communication event to indicate that information captured by information capture devices is to be incorporated into the user's notes. The information accessed in step 504 may also include time information, page information, and position information (if available) associated with the captured written information. According to an embodiment of the present invention, the written information captured by note taking device 102 and the associated time, page, and position information may be represented in XML format.

Data processing system 104 then processes the information accessed in step 504 to identify occurrences of one or more marks in the captured written information that indicate that information of a particular type is to be incorporated into the notes (step 506). As previously described, various different techniques may be used to indicate that information of a particular type is to be integrated with the user's notes. For example, if special marks are used, then in step 506, data processing system 104 parses the written information captured by note taking device 102 and accessed in step 504 to identify occurrences of the special marks. If special areas on a page are used to indicate information of a particular type, then in step 506, data processing system 104 accesses information (e.g., template information for the page) identifying the layout of the special areas, and based upon the template information and the position information associated with the written information accessed in step 504, identifies one or more marks marked on one or more special areas.

For each mark identified in step 506, data processing system 104 then determines the time information, page information, and position information (if available) associated with the mark (step 508). The time information indicates the approximate time when the mark was made in the notes by the user. The page information identifies the page on which the mark was made. The position information, if provided, identifies the location on the page where the mark was made. According to an embodiment of the present invention, the time information, page information, and position information for the mark may be determined from the information accessed in step 504.

For each mark identified in step 506, data processing system 104 then determines the type of information corresponding to the mark (step 510). If special marks are used, then the type of information can be determined from the identity of the mark itself. For example, a "V" inside a circle may signify video information, an "A" inside a circle may signify audio information, an "I" inside a circle may signify image information, a "W" inside a circle may signify whiteboard information, and so on. If the type of information is identified by the position of a mark on a page (e.g., in embodiments that use pages with special areas designated on them), then the position information associated with a mark along with the template information for the page is used to identify the type of information corresponding to the mark.

For each mark identified in step 506, data processing system 104 then identifies an information capture device 100 for the mark (step 512). The identification of an information capture device for a mark depends on the type of information determined for the mark in step 510. According to an embodiment of the present invention, for a particular type of information determined for a particular mark in step 510, data processing system 104 determines a set of information capture devices 100 that captured information of that particular type during the information communication event when the mark was made. Data processing system 104 then selects a particular information capture device from the set of information capture devices. The selection of the particular information capture device may depend on various factors such as the quality of information captured by the devices, the completeness of the information, and the like. For example, according to an embodiment of the present invention, an information capture device that has captured high quality information may be selected in step 512. An information capture device may also be specified as the default selection. If the set of information capture devices includes only one information capture device, then that information capture device is selected in step 512.

For example, if a particular type of information corresponding to a mark is identified in step 510 to be audio information, data processing system 104 may determine a set of audio information capture devices (e.g., one or more microphones) that were used to capture audio information during the information communication event when the mark was made. Data processing system 104 may then select one audio capture device for the mark in step 512 from the set of audio information capture devices. It should be understood that in alternative embodiments, more than one information capture device 100 may be selected for a particular mark in step 512.

As previously described, in certain embodiments of the present invention, a mark identified in step 506 may specifically identify an information capture device. In such embodiments, in step 512, for each mark identified in step 506, data processing system 104 identifies the information capture device corresponding to the mark. In this embodiment, step 510 may not be performed.

For each mark identified in step 506, data processing system 104 then identifies a portion of the information captured by the information capture device determined for the mark in step 512 (step 514). The portion of information for each mark is identified based upon time information associated with the mark and based upon time information associated with the information captured by the information capture device determined for the mark in step 512. As previously described, each information capture device 100 is configured to associate time information with the captured information identifying the approximate time of capture of the information. This information is used for selection of the portion in step 514.

The portion of information identified for a mark may vary depending on the type of information corresponding to the mark determined in step 510 or the type of information captured by the information capture device identified for the mark in step 512. The following examples assume that the clocks of the information capture devices 100 have been synchronized with the clock of note taking device 102.

If the type of information is video information, then the portion determined in step 514 may correspond to one or more keyframes selected from the video information captured by a video capture device identified in step 512 and having a timestamp same as or near to the time information associated with the mark. If the type of information is image information, then the portion determined in step 514 may correspond to an image selected from images captured by an image capture device identified in step 512 and having a time that is same as or close to the time of the mark. If there is no image that has the same timestamp as the time associated with the mark, then an image that is closest in time (in the past or in the future) to the time of the mark may be selected as the portion in step 514. If the type of information corresponding to a mark is audio information, then data processing system 104 may select an audio portion from audio information captured by an audio capture device identified in step 512. According to an embodiment of the present invention, a user-configurable fixed length (e.g., 10 seconds of audio information) of audio information portion in the past from the time of the mark may be selected from the captured audio information. In some embodiments, a portion of audio information in the future from the time of the mark may also be selected along with the portion selected from the past. According to another embodiment, the selected audio portion may contain a particular sentence being spoken at the time of the mark and one or more other sentences spoken around the sentence. It should be understood the various other heuristics known to those skilled in the art may also be used to select a portion of captured information for each mark in step 514.

For each mark identified in step 506, data processing system 104 then generates a static visual representation for the portion of information identified for the mark in step 514 (step 516). A static visual representation for a portion of information is a representation of the information in the portion selected in step 514 that can be printed on a paper page.

The static visual representation for a portion of information depends on the type of the information. For example, if the portion is audio information, the audio information portion selected in step 514 may be transcribed and the resultant transcription represents the static visual representation for the audio information portion. The transcription may identify the words spoken in the audio information portion, and possibly identify the speaker(s) of the information and other characteristics that can be determined from the audio information portion using audio processing techniques known to those of ordinary skill in the art. According to an embodiment of the present invention, the audio information portion selected in step 514 may also be translated from one form to another. For example, the audio information in the portion may be translated from a first language spoken in the portion to a second language and the static visual representation may represent a transcription in the second language. For example, if the audio information portion selected in step 514 comprises information spoken in Japanese, as part of generating the static visual representation for the audio portion, the Japanese information may be translated to English and the English transcription may represent the static visual representation for the audio information portion.

If the portion of information selected in step 514 is video information or a set of video keyframes extracted from the video information, then one or more of the keyframes may be selected in step 516. The selected keyframe(s) may be converted to an appropriate format that can be printed on paper. Various image processing operations (e.g., contrast enhancement, cropping, fitting, etc.) known to those of ordinary skill in the art may be performed on the keyframe(s). The converted and processed keyframe(s) represent the static visual representation corresponding to the video information portion.

If the portion of information is an image (e.g., image of a slide, image of a whiteboard, etc.) selected from image information (or whiteboard information, or slides information), then the image may be converted to an appropriate format that can be printed on a paper page. Various image processing operations (e.g., contrast enhancement, cropping, fitting, etc.) known to people of ordinary skill in the art may be performed on the image information. The converted and processed image represents the static visual representation corresponding to the image (or slides, or whiteboard information) information portion.

Data processing system 104 then generates an augmented notes electronic version that can be printed on a paper page (step 518). The augmented notes electronic version comprises a visual representation of the notes written by the user along with static visual representations generated in step 516. The augmented notes electronic version thus integrates the user's written notes with static visual representations of information identified by the user to be incorporated into the notes. Various different page formats may be used for the augmented notes electronic version. According to an embodiment of the present invention, the format used for the augmented notes electronic version resembles the format of the page used by the user for taking the notes.

The augmented notes electronic version may be generated in various formats such as an image file, a PDF file, etc. that can be printed on paper. In other embodiments, the augmented notes electronic version may also be generated in the form of a web page, etc. that can also be printed on paper. In certain embodiments (e.g., in a web page embodiment), a user may be allowed to interact with the augmented notes electronic version. For example, a web page may be generated that comprises links for the various portions of information that are to be integrated with the user's notes. A user may select a link to access the captured portion of information corresponding to the link.

According to an embodiment of the present invention, as part of the processing performed in step 518, for each mark identified in step 506, data processing system 104 determines a location in the visual representation of the user's notes for placing each static visual representation generated in step 516. It should be understood that various different techniques may be used to determine the locations of the static visual representations in the visual representation of the user's notes. The granularity of the position for placing the static visual representations may vary in different embodiments of the present invention. In certain embodiments, the location-in-notes information may also be used for determining on which page to place a static visual representation for a mark.

According to an embodiment of the present invention, the granularity of placement may be at page level and may be based on the location of a mark corresponding to a static visual representation. In this embodiment, for each mark, data processing system 104 may determine page information for the mark and specify that page as the location for placing the static visual representation for the mark.

In other embodiments, the page and position information associated with a mark may be used to determine location of a static visual representation for the mark. In this embodiment, the location of a static visual representation for a mark is determined to be on a page identified by the page information associated with the mark in a location identified by the position information associated with the mark. The static visual representation may be superimposed on the mark in the visual representation of the notes.

Several other heuristics may also be used to determine locations for laying out visual representations on a page in the augmented notes electronic version. For example, the visual representations may be laid out along a margin of the page in top-to-bottom position in chronological order. Other heuristics may also be used. In embodiments where the information capture devices store location-in-notes information along with the captured information, the location-in-notes information may be used to identify locations for static visual representations generated for the captured information.

The size of a static visual representation may be fixed, or may be variable based upon the size of the location in the visual representation of the notes available for placing the static visual representation. For example, the size of a static visual representation may grow to fill in the blank space available on a notes page for placing the static visual representation. The size of a static visual representation may also be reduced (or cropped) to make it fit into the available space in the notes.

According to an embodiment of the present invention, the augmented notes electronic version also comprises indexing information for one or more static visual representations included in the augmented notes electronic version. The indexing information for a static visual representation is typically located in a location proximal to the corresponding static visual representation. The indexing information for a static visual representation enables a user to access the electronic captured information from which the static visual representation was generated. The index information can be used as an index into the captured electronic information from which a portion of information that was used to generate the static visual representation was selected in step 514. According to an embodiment of the present invention, the indexing information may comprise a text string indicating a timestamp associated with the portion of information from which the static visual representation was generated. A barcode may also be used to represent the indexing information. The barcode may be placed next to the static visual representation corresponding to the barcode. Various other techniques known to those skilled in the art, such as glyphs, etc. may also be used as indexing information.

The augmented notes electronic version generated in step 518 may then be printed on one or more paper pages to generate an augmented notes paper document (step 520). As part of step 520, data processing system 104 may communicate the augmented notes electronic version generated in step 518 to a paper document output device that generates the augmented notes paper document by printing the augmented notes electronic version on one or more paper pages.

Contents of the augmented notes paper document comprise a visual representation of the notes written by the user along with static visual representations of information identified by the user while taking the notes to be integrated with the user's notes. The augmented notes paper document thus integrates the user's written notes with static visual representations of information identified by the user to be incorporated into the notes.

According to an embodiment of the present invention, indexing information for one or more static visual representations may also be printed on the augmented notes paper document. As previously described, the indexing information for a static visual representation enables a user to access the electronic captured information from which the static visual representation was generated. The index information can be used as an index into the captured electronic information from which a portion of information that was used to generate the static visual representation was selected in step 514. The indexing information may be embodied in various ways.

According to one embodiment, the indexing information may comprise a text string indicating a timestamp associated with the portion of information which was used to generate the static visual representation. In this embodiment, a user of an augmented notes paper document may access electronic information for a static visual representation by providing the index time information printed on the augmented notes paper document corresponding to the static visual representation to a multimedia player (or any other output device or application) that has access to the captured information. The multimedia player may initiate playback of the captured information from or around the time provided by the user. For example, if the static visual representation represented a keyframe extracted from captured video information, entering the indexing time information may initiate playback of the video from the time entered by the user.

According to another embodiment, the indexing information may be represented by a barcode printed on the augmented notes paper document near the corresponding static visual representation. In this embodiment, a user of the augmented notes paper document can scan a particular barcode and access electronic information corresponding to the scanned barcode via an output device. For example, a user may scan a barcode using a scanner connected to the user's PDA. Electronic information corresponding to the scanned barcode (or electronic information from a time corresponding to the scanned barcode) may be output to the user via an output device. The barcode may identify a timestamp and electronic information from the time identified by the timestamp may be played back to the user. The barcode may also contain information identifying an information communication event (e.g., barcode may comprise an event ID) and electronic information for the identified event may be output. The barcode may also comprise other information such as codes for controlling playback of the information. For example, the barcode may comprise a code that identifies a particular captured information source for playback (e.g., a code that provides instructions to start playing a video of a meeting as opposed to a slideshow).

Figure 6A:
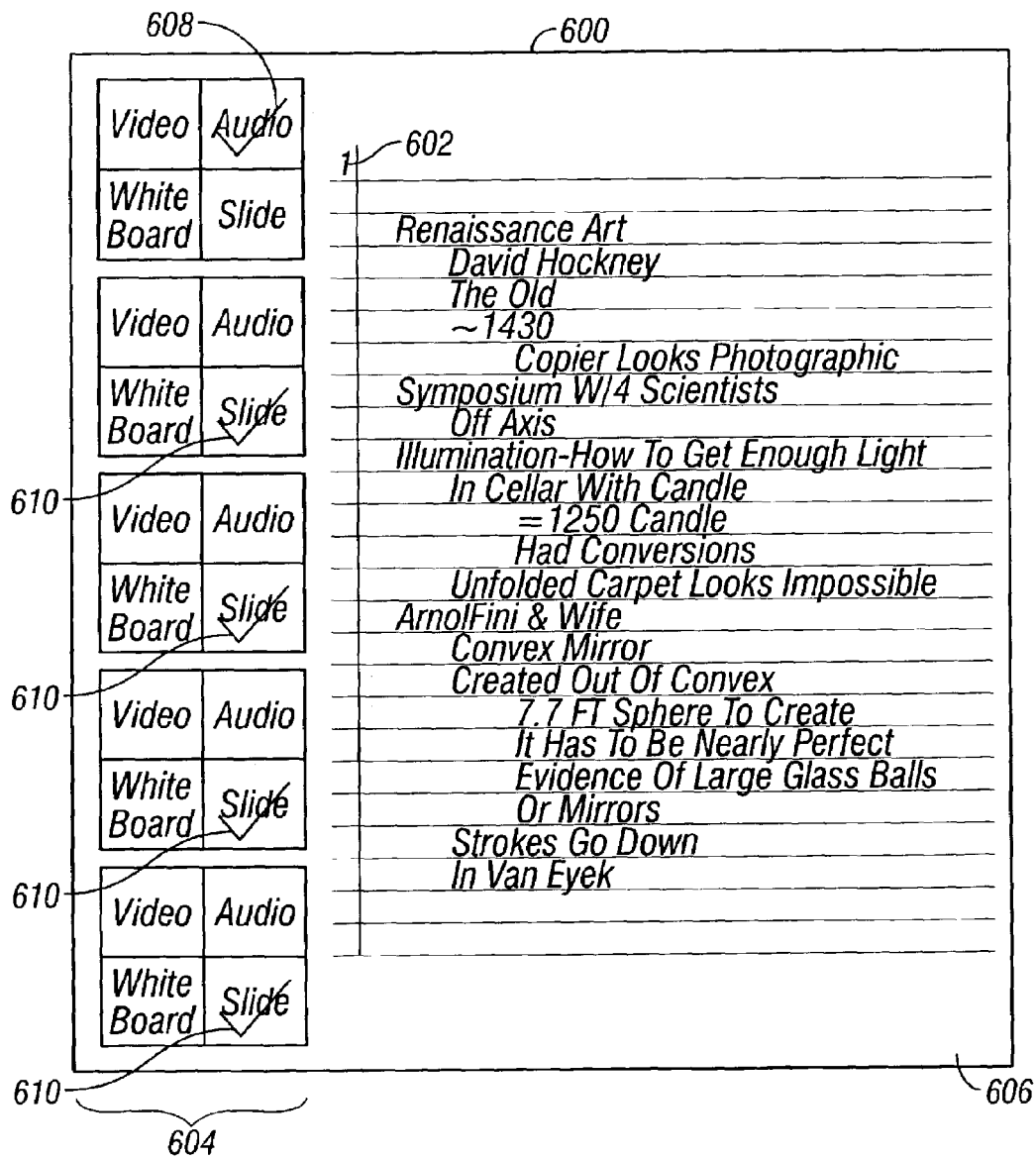
FIG. 6A is a simplified example of a paper page showing notes taken by a user and marks made by the user to identify information to be integrated with the user's notes according to an embodiment of the present invention.

FIG. 6A is a simplified example of a paper page 600 showing notes taken by a user and marks made by the user to identify information to be integrated with the user's notes according to an embodiment of the present invention. As depicted in FIG. 6A, the user has taken written notes in section 606 of page 600 using a marking device such as a pen or a pencil. Page 600 comprises special areas 604 for video information, audio information, whiteboard information, and slide information. While taking the notes, the user has also made marks (tick marks) in special areas 604 on page 600. The marks indicate information that the user would like to be incorporated into the user's notes. As shown, the user has made a mark 608 to select audio information and marks 610 to select slide information. A page identifier 602 in the form of a page number is also printed on page 600.

Figure 6B:
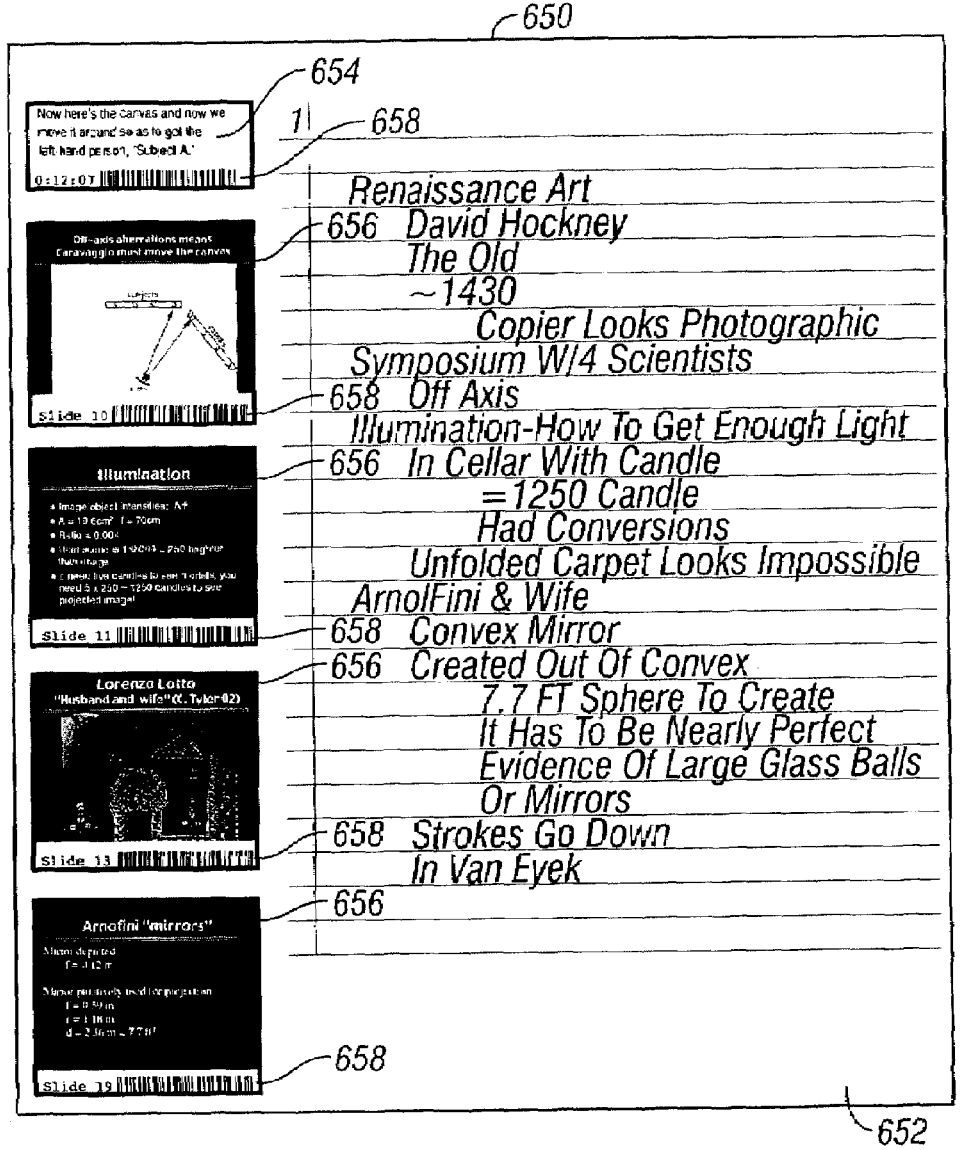
FIG. 6B depicts a simplified augmented notes paper document page generated according to an embodiment of the present invention for the paper page depicted in FIG. 6A.

FIG. 6B depicts a simplified augmented notes paper document page 650 generated according to an embodiment of the present invention for page 600 depicted in FIG. 6A. As shown in FIG. 6B, a visual representation of the notes taken by the user in area 606 of page 600 depicted in FIG. 6A is printed in section 652 of page 650. Page 650 in FIG. 6B also includes a static visual representation for each mark written by the user in the special areas of page 600 in FIG. 6A. For example, page 650 includes a transcription 654 of the audio information corresponding to mark 608 on page 600, and slides 656 corresponding to marks 610 on page 600. Accordingly, page 650 in FIG. 6B integrates the user's written notes along with information identified by the user during note-taking to be integrated with the user's notes.

Indexing information 658 is also printed for each static visual representation. In the embodiment depicted in FIG. 6B, the indexing information for the audio transcription includes a time stamp corresponding to the transcription and a barcode. Indexing information for the slides includes a slide number and a barcode. A user of augmented notes paper document page 650 may use the indexing information to access captured electronic information corresponding to the static visual representations. The indexing information provides an index into the captured information.

The following example further illustrates a use of the present invention. Assume that Ann is a marketing manager attending a presentation on her company's latest sales figures. During the presentation, she writes notes on paper pages using a note taking device and a pen. When Ann reaches page 3 of her notes, the presenter shows a PowerPoint summary sales chart for the last quarter, a chart Ann would like to include in her notes. Assuming that Ann is using pages having a layout shown in FIG. 6A for writing her notes, Ann checks off the "slide" special area located to the left of where she is currently writing. Later, when Ann is on page 5 of her notes, someone quotes a customer testimonial that Ann would like to use in her marketing literature. To capture the exact quote, Ann checks off an "audio" special area to the left of where she is currently writing. At the end of the presentation, Ann docks her note taking device into a networked paper document output device (e.g., a networked printer) and hits the "generate augmented notes paper document" button provided by the paper document output device. In response, the paper document output device generates an augmented notes paper document based upon Ann's notes and information captured during the presentation by one or more information capture devices. Contents of the augmented notes paper document comprise a visual representation of Ann's notes and visual representations for special areas checked by Ann. For example, a visual representation of the summary sale chart slide is printed on page 3 of the augmented notes paper document. The results of speech-to-text translation of the captured audio information (including the relevant quote) during ten seconds preceding to the time when Ann checked the "audio" special area on page 5 are printed on page 5 of the augmented notes paper document. Indexing information in the form of barcodes may also be printed beneath the visual representations in the augmented notes paper document. Ann can scan the barcodes using her PDA or another computer to bring up a viewer that outputs the captured information. For example, scanning the barcode printed under the visual representation of the slide invokes a viewer that can be used to access the captured slide information. Scanning the barcode below the visual representation of the audio information printed on page 5 of the augmented notes paper document enables playback of the captured audio information from the time (or sometime before) when Ann checked off the "audio" special area on page 5 of her notes. Ann can browse the captured audio information from that point forward or backwards. It should be understood that the present invention can also be used in several other environments.

Figure 7A:
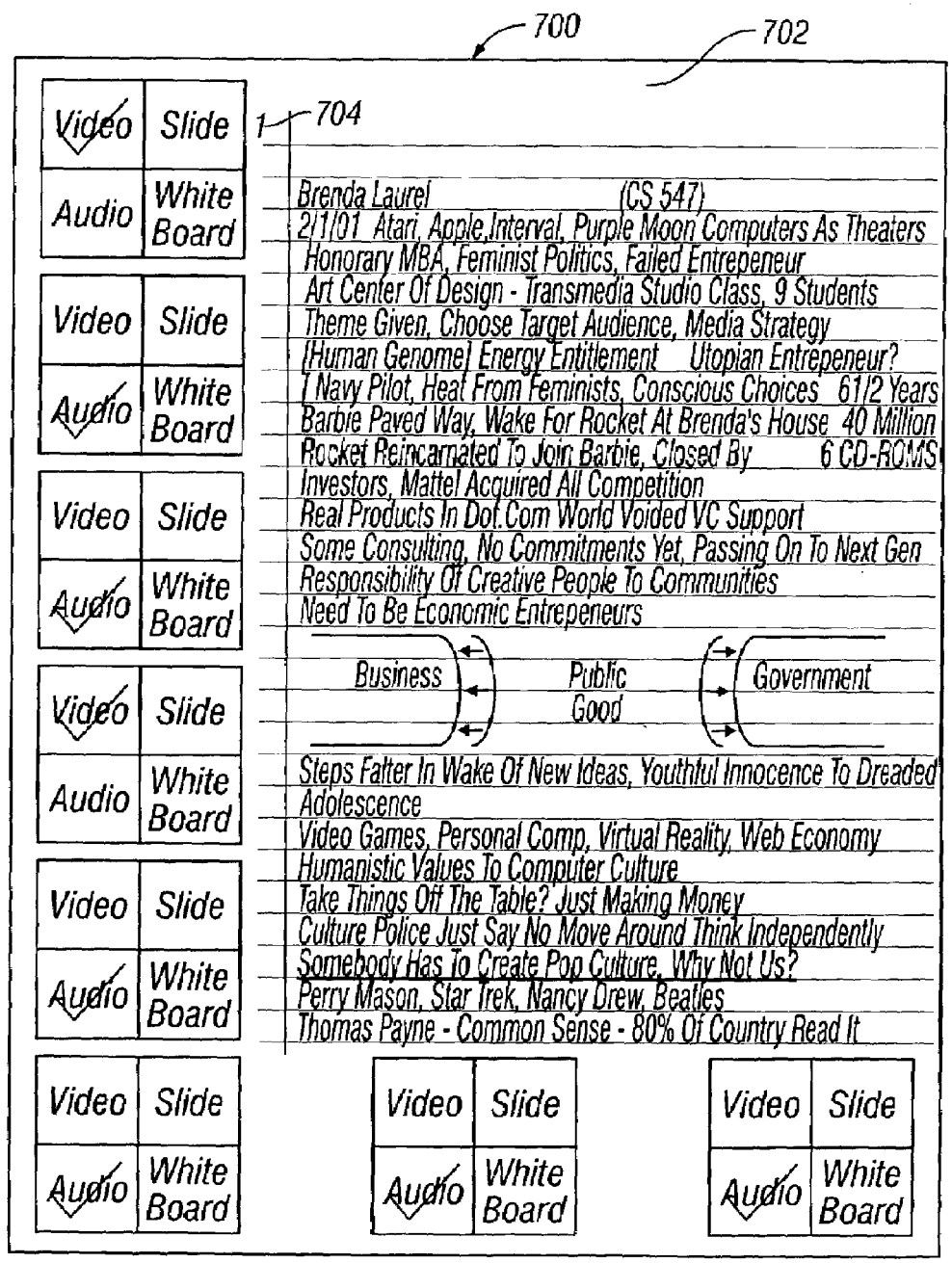
FIG. 7A is another simplified example of a paper page showing notes taken by a user and marks made by the user on the page to identify information to be integrated with the user's notes according to an embodiment of the present invention.

FIG. 7A is another simplified example of a paper page 700 showing notes taken by a user and marks made by the user on the page to identify information to be integrated with the user's notes according to an embodiment of the present invention. As depicted in FIG. 7A, the user has taken written notes in section 702 of page 700 using a marking device such as a pen or a pencil for a lecture presented by Brenda Laurel. Page 700 comprises special areas for video information, audio information, whiteboard information, and slide information. The areas are positioned along the left and bottom margin of page 700. While taking the notes, the user has also made several marks (e.g., tick marks) in the special areas on page 700. Each tick mark identifies a type of information (or alternatively, a source of information) to be integrated with the user's notes. A page identifier 704 in the form of a page number is also printed on page 700.

Figure 7B:
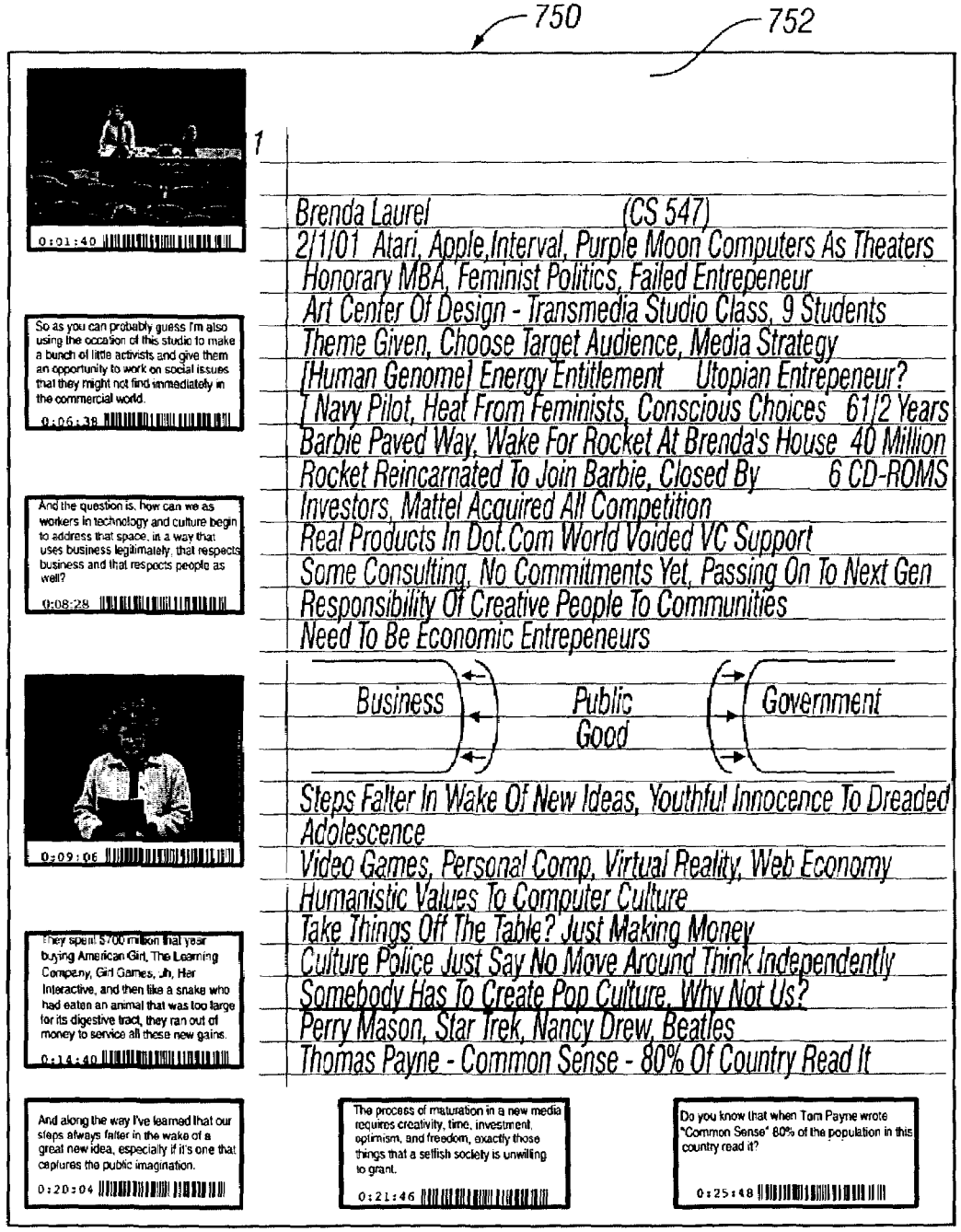
FIG. 7B depicts a simplified augmented notes paper document page generated according to an embodiment of the present invention for the page depicted in FIG. 7A.

FIG. 7B depicts a simplified augmented notes paper document page 750 generated according to an embodiment of the present invention for page 700 depicted in FIG. 7A. As shown in FIG. 7B, a visual representation of the notes taken by the user in area 702 of page 700 depicted in FIG. 7A is printed in section 752 of page 750. Page 750 also includes a static visual representation for each mark written by the user in the special areas of page 700 in FIG. 7A. Each tick mark on page 700 marked in a special area identifying video information has been replaced by a keyframe extracted from a portion of captured video information having a timestamp that is approximately close to (or same as) the time when the user made the tick mark in the notes. The timestamp of the keyframe is also printed. Each mark identifying audio information has been replaced by a text transcript of the portion of captured audio information corresponding to the mark (e.g., transcript of audio information around the time when the user made the mark). A time stamp associated with the audio transcript is also printed. Accordingly, page 750 in FIG. 7B integrates notes written by the user during the Brenda Laurel presentation along with information identified by the user during the lecture to be incorporated into the user's notes.

A barcode is also printed for each static visual representation printed on page 750. The barcode for a static visual representation represents indexing information that can be used by a user to access the captured electronic information corresponding to the static visual representation. For example, a user may scan a barcode printed below a video keyframe to play back video information from the time of the keyframe. A user may scan a barcode printed below an audio transcript to play back audio information from the timestamp associated with the audio transcript.

The timestamps associated with the static visual representations and printed on page 750 may also be used as indexing information. For example, a user may provide the timestamp associated with a keyframe to a video output application (e.g., a media player) or device to play back video information from the time of the keyframe. A user may provide the timestamp associated with an audio transcript to an audio output application (e.g., a media player) or device to play back audio information from the timestamp associated with the audio transcript.

In the embodiments described above, a user indicates that captured information of a particular type (or information from a capture device source) is to be integrated with the user's notes by making marks (e.g., tick marks) on the paper used for note-taking during the note taking activity. In alternative embodiments, events or signals occurring during an information communication event may also be used to identify information that the user would like to incorporate into the user's notes. These events or signals may be triggered by the user or by some other entity or device. Each event or signal may identify information of a particular type that is to be incorporated into the user's notes. Alternatively, the event or signal may identify that information from a particular source (e.g., a particular capture device) is to be incorporated into the user's notes. Information indicating when the event or signal occurred may be stored and used to identify a portion of captured information corresponding to the event. The time information associated with an event or signal may also be used to identify a location in the user's notes where a static visual representation generated from a portion of information selected for an event is to be incorporated. Other information such as location-in-notes information may also be stored for each event. As described above, various techniques may be used for determining or providing the location-in-notes information. The location-in-notes information may be used to identify a location in the user's notes where a static visual representation generated from a portion of information selected for an event is to be incorporated.

There are various ways in which a user can control and/or initiate the events or signals. For example, in an embodiment where the note-taker can control the operation of an information capture device that is configured to capture information during an information communication event, the act of capturing information or a signal or event initiating capture of information using the information capture device may indicate that the user is interested in incorporating the captured information (e.g., the information captured in response to the event or signal) into the user's notes. The time of capture or of the event or signal may be used to determine the location within the user's written notes where the static visual representation of the captured information is to be incorporated.

For example, during an information communication event, the user may use a camera to capture an image of the whiteboard. The act of clicking the camera to capture an image may indicate that the captured image is to be integrated with the user's notes. The time when the image was taken may be used to determine the location within the user's written notes where the captured image is to be incorporated.

According to another embodiment, note taking device 102 may provide one or more user-selectable buttons for selecting various types (or various information sources) of information. For example, a button may be provided for video information, a button for audio information, a button for slides information, etc. While taking notes, a user may press a button to indicate that information corresponding to the button is to be integrated with the user's notes. Accordingly, selection of a button triggers an event or signal that indicates that information of a particular type is to be incorporated into the user's notes. Information identifying button presses/selections may be stored by note taking device 102. The stored information may identify the type of information corresponding to the button and the approximate time when the button was selected by the user. Information identifying a page used by the user when the button was selected may also be stored. The time information associated with the button selection and information identifying a page when the button was selected by the user may be used to determine the portion of the captured information to be incorporated and to determine the location in the user's notes where a static visual representation for the identified portion of information is to be incorporated. In alternative embodiments, the user-selectable buttons may also be provided on the marking device (e.g., a pen having various user-selectable buttons).

In other embodiments, a set of barcodes may be pre-printed on a page used by the user for taking notes. Each barcode in the set of barcodes may correspond to a particular type (or a particular source) of information. A user may indicate that information of a particular type is to be incorporated into the user's notes by scanning a particular barcode corresponding to the particular type of information. Scanning the barcode thus represents or triggers an event that indicates that information of a particular type is to be integrated with the user's notes. Information related to the event such as the type of information corresponding to the scanned barcode, the time of the scan, etc. may be stored by note taking device 102. This information may be used to determine a portion of information corresponding to the scan and/or the location of the static visual representation generated for the selected portion of information. Various different devices may be used for scanning the barcode. According to an embodiment of the present invention, the scanning device may be incorporated in the marking device.

Figure 8:
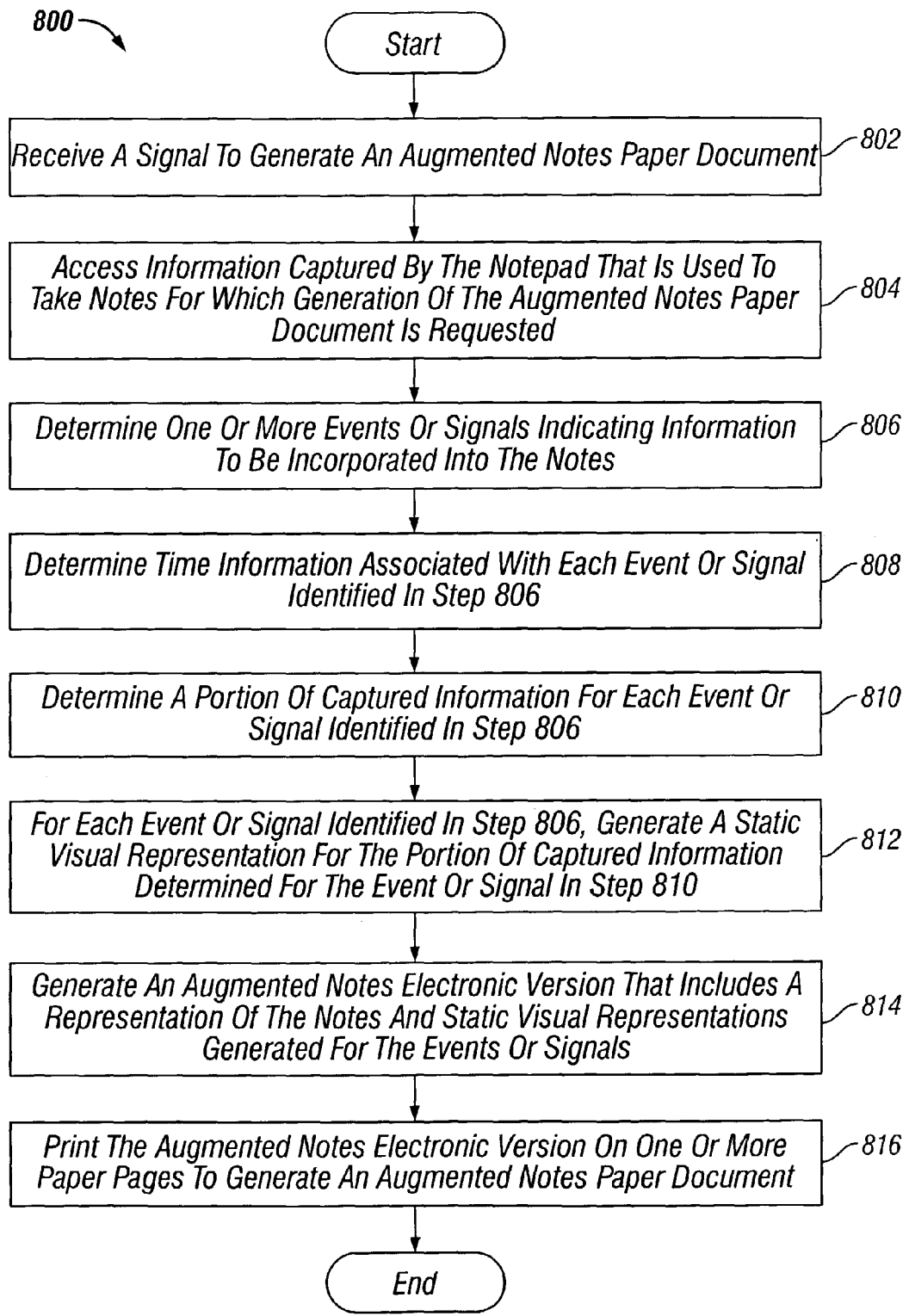
FIG. 8 depicts a simplified high-level flowchart depicting a method of generating an augmented notes paper document according to an embodiment of the present invention wherein events or signals are used to indicate that one or more portions of captured information are to be incorporated into the notes.

FIG. 8 depicts a simplified high-level flowchart 800 depicting a method of generating an augmented notes paper document according to an embodiment of the present invention wherein events or signals are used to indicate that one or more portions of captured information are to be incorporated into the notes. According to an embodiment of the present invention, the method depicted in FIG. 8 may be performed by software modules executed by data processing system 104, by hardware modules of data processing system 104, or combinations thereof. In alternative embodiments (e.g., the embodiment depicted in FIG. 1B), the method may be performed by software modules executed by paper document output device 106, by hardware modules of paper document output device 106, or combinations thereof. In alternative embodiments, the processing may be performed by data processing system 104 in association with paper document output device 106. The description below assumes that the processing is performed by data processing system 104. This is however not intended to limit the scope of the present invention as recited in the claims. Flowchart 800 depicted in FIG. 8 is merely illustrative of an embodiment incorporating the present invention and does not limit the scope of the invention as recited in the claims. One of ordinary skill in the art would recognize variations, modifications, and alternatives.

As depicted in FIG. 8, processing is initiated when data processing system 104 receives a signal to generate an augmented notes paper document (step 802). The signal may be received via a user interface (e.g., a user interface screen, an input button, etc.) provided by data processing system 104. In embodiments of the present invention in which note taking device 102 can simultaneously store information for multiple information communication events, the signal received in step 802 may identify a particular information communication event for which the augmented notes paper document is to be generated. The signal received in step 802 may also identify a note taking device 102 that is used for taking notes for which an augmented notes paper document is to be generated.

Upon receiving the signal, data processing system 104 accesses information captured by a note taking device 102 that is used to take notes for which generation of the augmented notes paper document is requested (step 804). As previously described, data processing system 104 may access the information from note taking device 102 in one of several different ways including via a communication link, via a network, via a docking interface if the note taking device 102 is docked with the data processing system 104, from a central database where the information is stored, etc. The information accessed in step 504 includes written information and other associated information captured by note taking device 102. The written information may include information representing notes taken by a user using the note taking device 102 during an information communication event. The written information may also include information about marks made by the user to indicate that information of a particular type is to be incorporated with the user's notes. The information associated with the written information may also include time information, page information, and position information (if available) associated with the written information. According to an embodiment of the present invention, the notes information and the associated time, page, and position information may be represented in XML format.

The information accessed in step 804 may also include information captured by note taking device 102 or some other device or application related to events or signals indicating that information of a particular type is to be incorporated into the user's notes. The information related to an event or signal may identify the event or signal and identify information of a particular type (or from a particular source) that is to be incorporated into the user's notes. The information related to an event or signal may also include information indicating when the event or signal occurred. Other information such as location-in-notes information associated with the event may also be included.

Data processing system 104 then determines one or more events or signals indicating information to be incorporate into the notes (step 806). As described above, the act of capturing information during an information communication event using an information capture device such as a camera may represent an event determined in step 806. Several other types of events and signals that occurred during the information communication event may also be determined. The information determined in step 806 may also identify the information capture device used to capture information corresponding to each event or signal.

Data processing system 104 may determine the events or signals in step 806 from information accessed in step 804. Data processing system 104 may also determine the events or signals from information stored by one or more information capture devices, or information stored by other devices or applications.

Data processing system 104 then determines the time information associated with each event or signal identified in step 806 (step 808). The time information usually indicates when the event or signal occurred.

Data processing system 104 then determines a portion of captured information corresponding to each event or signal identified in step 806 (step 810). The captured information portion for an event or signal may be determined based upon time information associated with the event or signal and upon time information associated with the captured information. The portion of information determined for an event or signal may vary depending on the type of information corresponding to the event or signal. If the type of information corresponding to an event or signal is video information, then the portion determined in step 810 may correspond to one or more keyframes selected from the video information and having a timestamp same as or near to the time information associated with the event or signal. If the type of information corresponding to the event or signal is image information, then the portion determined in step 810 may correspond to an image selected from images captured by an image capture device having a time that is same as or close to the time of the mark. If there is no image that has the same timestamp as the time associated with the event or signal, then an image that is closest in time (in the past or in the future) to the time of the event or signal may be selected as the portion of information in step 810. If the type of information corresponds to audio information, then data processing system 104 may select an audio portion from audio information captured by an audio capture device. According to an embodiment of the present invention, a user-configurable fixed length (e.g., 10 seconds of audio information) of audio information portion in the past from the time of the event or signal may be selected from the captured audio information. In some embodiments, a portion of audio information in the future from the time of the event or signal may also be selected along with the portion selected from the past. According to another embodiment, the selected audio portion may contain a particular sentence being spoken at the time of the event or signal and one or more other sentences spoken around the sentence. It should be understood the various other heuristics known to those skilled in the art may also be used to select a portion of captured information for each event or signal in step 810.

For each event or signal identified in step 806, data processing system 104 then generates a static visual representation for the captured information portion determined for the event or signal in step 810 (step 812). As described above with respect to flowchart 500 depicted in FIG. 5B, the static visual representation for a portion of captured information for a particular event or signal depends on the type of the captured information.

Data processing system 104 then generates an augmented notes electronic version that can be printed on one or more paper pages (step 814). The augmented notes electronic version includes a visual representation of the notes written by the user along with static visual representations generated for information portions identified in step 810 for events or signals identified in step 806. The augmented notes electronic version thus integrates the user's written notes with static visual representations of information identified by the user to be incorporated into the notes. Various different formats may be used for the augmented notes electronic version. According to an embodiment of the present invention, the format used for the augmented notes electronic version resembles the format of the page used for taking the notes. As described above, the augmented notes electronic version may also comprise indexing information for one or more static visual representations included in the augmented notes electronic version.

As previously described, the augmented notes electronic version may be generated in various formats such as an image file, a PDF file, etc. that can be printed on paper. In other embodiments, the augmented notes electronic version may also be generated in the form of a web page, etc. that can be printed on paper. In certain embodiments (e.g., in a web page embodiment), a user may be allowed to interact with the augmented notes electronic version. For example, a web page may be generated that comprises links for the various portions of information that are to be integrated with the user's notes. A user may select a link to access the captured portion of information corresponding to the link.

According to an embodiment of the present invention, as part of the processing performed in step 814, for each event or signal mark identified in step 806, data processing system 104 determines a location in the visual representation of the user's notes for placing the static visual representations generated in step 812. Various different techniques may be used to determine the locations of the static visual representations in the visual representation of the user's notes. The granularity of the position for placing the static visual representations may vary in different embodiments of the present invention. In certain embodiments, the location-in-notes information, if available, may also be used for determining on which page to place a static visual representation for an event or mark.

According to an embodiment of the present invention, the granularity of placement may be at page level and may be based upon the time information associated with an event or signal corresponding to a static visual representation. In this embodiment, for each event or signal, based upon the time associated with the event or signal and based upon time information and page information associated with the captured written information, data processing system 104 may determine a page of the notes in the augmented notes electronic version for placing the static visual representation for the event or signal. In certain embodiments, the location-in-notes information may also be used for determining on which page to place a static visual representation for an event or signal.

In other embodiments, based upon the time associated with the event or signal and based upon time information, page information, and position information associated with the captured written information, a particular location on a particular page in the visual representation of the notes may be determined for placing the static visual representation for an event or signal. According to an embodiment of the present invention, the selected location is proximal to a stroke having a timestamp that is approximately at or near the timestamp of the event or signal.

Several other heuristics may also be used to determine locations for laying out visual representations on a page. For example, the visual representations may be laid out along a margin of the page in top-to-bottom position in chronological order. Other heuristics may also be used. In embodiments where the information capture devices store location-in-notes information along with the captured information, the location-in-notes information may be used to identify locations for static visual representations.

The size of a static visual representation may be fixed, or may be variable based upon the size of the location in the notes available for placing the static visual representation. For example, the size of a static visual representation may grow to fill in the blank space available on a notes page for placing the static visual representation. The size of a static visual representation may also be reduced (or cropped) to make it fit into the available space in the notes.

The augmented notes electronic version generated in step 814 may then be printed on one or more paper pages to generate an augmented notes paper document (step 816). Data processing system 104 may communicate the augmented notes electronic version generated in step 814 to a paper document output device that generates the augmented notes paper document by printing the augmented notes electronic version on one or more paper pages.

Contents of the augmented notes paper document comprise a visible representation of the notes written by the user along with static visual representations of captured information identified by the user while taking the notes to be integrated with the user's notes. The augmented notes paper document thus integrates the user's written notes with static visual representations of information identified by the user to be incorporated into the notes. Contents of the augmented notes paper document may also comprise indexing information that may be used by a user of augmented notes paper document to access the captured electronic information.

In addition to marks and events or signals, other heuristics may also be used to automatically select portions of information captured during an information communication event to be incorporated with the user's notes. According to an embodiment of the present invention, rules may be defines that govern when and what portions of information captured during an information communication event are to be included into the user's notes. For example, a user-defined rule may indicate that portions of information captured when a user takes "a lot of notes" are to be incorporated into the user's notes. The "lot of notes" condition may be characterized by a threshold value based upon the number of strokes written by the user per minute. According to this rule, portions of information captured when the "lot of notes" condition is met (e.g., when the threshold characterizing the condition is met) are incorporated into the user's notes. Another rule may be defined that indicates that portions of audio information captured when "a speaker speaks for a long time" are to be incorporated into the user's notes. A threshold indicating a length of time may be used to characterize the condition when "a speaker speaks for a long time". According to this rule, portions of information captured when the "speaker speaks for a long time" condition is met are incorporated into the user's notes. Several other rules and heuristics may also be used to indicate when and what portions of the captured information are to be incorporated into the user's notes.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. For example, in the embodiments described above, the written information and other associated information (e.g., time information) are captured by note taking device 102. In other embodiments, the information may be captured by the marking device used to write the notes. For example, the information may be captured by a pen that is used to write the notes. An example of such a pen is the Io™ pen manufactured by Logitech®, Inc. The Io™ pen captures and stores a digital version of a person's handwritten notes. The pen is equipped with an optical sensor that captures the notes a person writes on a special pad of paper. The Io™ can store multiple pages of handwritten notes in its internal memory, using an image file format. The information stored by the Io™ pen can then be used to generate an augmented notes paper document according to the teachings of the present invention. Other systems that are capable of capturing notes may also be used to capture the written information in alternative embodiments of the present system.

Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method of generating a paper document based upon information written by a user on one or more sheets of paper and based upon information captured during an information communication event by one or more information capture devices, the method comprising:
   accessing first information representative of markings left by the user on the one or more sheets of paper, the markings representative of information written by the user on the one or more sheets of paper;
   determining, from the information captured by the one or more information capture devices, one or more portions of information;
   wherein determining the one or more portions of information comprises:
      identifying one or more marks from the first information, each mark indicating that a portion of information from the information captured by the one or more information capture devices is to be integrated with the information written by the user;
      determining time information associated with each mark in the one or more marks; and
      identifying, from the information captured by the one or more information capture devices, a portion of information for each mark in the one or more marks based upon the time information associated with the mark and based upon time information associated with the information captured by the one or more information capture devices;
   generating a visual representation for each portion of information in the one or more portions of information; and
   generating a paper document wherein contents of the paper document comprise a visual representation of the markings representative of information written by the user on the one or more sheets of paper and the visual representations generated for the one or more portions of information.

2. The method of claim 1 wherein identifying the one or more marks from the first information comprises:
   accessing template information identifying locations of one or more special areas on the one or more sheets of paper used by the user to write the information; and
   identifying, from the first information, one or more marks that are located on the one or more special areas identified by the template information.

3. The method of claim 1 wherein a special character written by the user is identified as a mark.

4. The method of claim 1 wherein identifying the portion of information for each mark in the one or more marks comprises:
   identifying an information capture device from the one or more information capture devices for the mark; and
   selecting a portion of information captured by the information capture device identified for the mark.

5. The method of claim 4 wherein identifying the information capture device for the mark comprises:
   determining a type of information corresponding to the mark; identifying a set of information capture devices from the one or more information capture devices that are configured to record the type of information corresponding to the mark; and
   selecting an information capture device from the set of information capture devices for the mark.

6. The method of claim 1 wherein generating the paper document comprises:
   generating an electronic representation comprising a visual representation of the information written by the user and the visual representations generated for the one or more portions of information; and
   printing the electronic representation on one or more paper pages to generate the paper document.

7. The method of claim 6 wherein generating the electronic representation comprises:
   determining a location in the visual representation of the information written by the user for placing each visual representation; and
   generating the electronic representation such that each visual representation is placed in the visual representation of the information in the location determined for the visual representation.

8. The method of claim 1 wherein generating the visual representation for each portion of information in the one or more portions of information comprises:
   determining a type of information for each portion of information; and
   generating the visual representation for a portion of information based upon the type of information determined for the portion of information.

9. The method of claim 1 wherein the one or more portions of information include a first portion comprising audio information and wherein generating the visual representation comprises transcribing the audio information in the first portion.

10. The method of claim 1 wherein the one or more portions of information include a first portion comprising video information and wherein generating the visual representation comprises selecting a keyframe from the video information of the first portion.

11. The method of claim 1 wherein determining the one or more portions of information comprises:
    identifying a signal that caused capture of information by a first information capture device from the one or more information capture devices; and
    identifying information captured by the first information capture device in response to the signal.

12. The method of claim 11 wherein the contents of the paper document comprise a visual representation of the information captured by the first information capture device in response to the signal.

13. The method of claim 1 wherein the one or more portions of information includes a first portion and determining the one or more portions of information comprises selecting the first portion when a threshold associated with a rule has been satisfied.

14. A method of generating a paper document based upon information written by a user on a sheet of paper and based upon information captured by an information capture device, the method comprising:
    accessing first information representative of markings left by the user on the sheet of paper, the markings representative of information written by the user on the sheet of paper;
    determining a portion of information from information captured by the information capture device;
    wherein determining the portion of information comprises:

identifying, from the first information, a mark written by the user determining time information associated with the mark; and identifying the portion of information based upon the time information associated with the mark and based upon time information associated with the information captured by the information capture device;

generating a visual representation for the portion of information; and printing a visual representation of the information written by the user and the visual representation generated for the portion of information on one or more paper pages to generate the paper document.

15. The method of claim 14 wherein determining the portion of information comprises:
identifying a first signal; and
identifying, from the information captured by the information capture device, a portion of information captured by the information capture device in response to the signal.

16. The method of claim 14 wherein determining the portion of information comprises selecting the portion of information when a threshold associated with a rule has been satisfied.

17. A system for generating a paper document based upon information written by a user on one or more sheets of paper and based upon information captured during an information communication event by one or more information capture devices, the system comprising:
a communication module configured to receive first information representative of markings left by the user on the one or more sheets of paper, the markings representative of information written by the user on the one or more sheets of paper; a processor; and
a memory coupled to the processor, the memory configured to store a plurality of code modules for execution by the processor, the plurality of code module comprising:
a code module for determining, from the information captured by the one or more information capture devices, one or more portions of information;
wherein the code module for determining the one or more portions of information comprises:
a code module for identifying one or more marks from the first information, each mark indicating that a portion of information from the information captured by the one or more information capture devices is to be integrated with the information written by the user;
a code module for determining time information associated with each mark in the one or more marks; and
a code module for identifying, from the information captured by the one or more information capture devices, a portion of information for each mark in the one or more marks based upon the time information associated with the mark and based upon time information associated with the information captured by the one or more information capture devices;
a code module for generating a visual representation for each portion of information in the one or more portions of information; and
a code module for generating a paper document wherein contents of the paper document comprise a visual representation of the information written by the user on the one or more sheets of paper and the visual representations generated for the one or more portions of information.

18. The system of claim 17 wherein the code module for identifying the one or more marks from the first information comprises:

a code module for accessing template information identifying locations of one or more special areas on the one or more sheets of paper used by the user to write the information; and
a code module for identifying, from the first information, one or more marks that are located on the one or more special areas identified by the template information.

19. The system of claim 17 wherein a special character written by the user is identified as a mark.

20. The system of claim 17 wherein the code module for identifying the portion of information for each mark in the one or more marks comprises:
a code module for identifying an information capture device from the one or more information capture devices for the mark; and
a code module for selecting a portion of information captured by the information capture device identified for the mark.

21. The system of claim 20 wherein the code module for identifying the information capture device for the mark comprises:
a code module for determining a type of information corresponding to the mark; a code module for identifying a set of information capture devices from the one or more information capture devices that are configured to record the type of information corresponding to the mark; and
a code module for selecting an information capture device from the set of information capture devices for the mark.

22. The system of claim 17 wherein the code module for generating the paper document comprises:
a code module for generating an electronic representation comprising a visual representation of the information written by the user and the visual representations generated for the one or more portions of information; and
a code module for printing the electronic representation on one or more paper pages to generate the paper document.

23. The system of claim 22 wherein the code module for generating the electronic representation comprises:
a code module for determining a location in the visual representation of the information written by the user for placing each visual representation; and
a code module for generating the electronic representation such that each visual representation is placed in the visual representation of the information in the location determined for the visual representation.

24. The system of claim 17 wherein the code module for generating the visual representation for each portion of information in the one or more portions of information comprises:
a code module for determining a type of information for each portion of information; and
a code module for generating the visual representation for a portion of information based upon the type of information determined for the portion of information.

25. The system of claim 17 wherein the one or more portions of information include a first portion comprising audio information and wherein the code module for generating the visual representation comprises a code module for transcribing the audio information in the first portion.

26. The system of claim 17 wherein the one or more portions of information include a first portion comprising video information and wherein the code module for generating the visual representation comprises a code module for selecting a keyframe from the video information of the first portion.

27. The system of claim 17 wherein the code module for determining the one or more portions of information comprises:

a code module for identifying a signal that caused capture of information by a first information capture device from the one or more information capture devices; and a code module for identifying information captured by the first information capture device in response to the signal.

28. The system of claim 27 wherein the contents of the paper document comprise a visual representation of the information captured by the first information capture device in response to the signal.

29. The system of claim 17 wherein the one or more portions of information includes a first portion and the code module for determining the one or more portions of information comprises a code module for selecting the first portion when a threshold associated with a rule has been satisfied.

30. A system for generating a paper document based upon information written by a user on a sheet of paper and based upon information captured by an information capture device, the system comprising:

a communication module configured to receive first information representative of markings left by the user on the sheet of paper, the markings representative of information written by the user on the sheet of paper; a processor; and a memory coupled to the processor, the memory configured to store a plurality of code modules for execution by the processor, the plurality of code module comprising:

a code module for determining a portion of information from information captured by the information capture device;

wherein the code module for determining the portion of information comprises:

a code module for identifying, from the first information, a mark written by the user;

a code module for determining time information associated with the mark; and a code module for identifying the portion of information based upon the time information associated with the mark and based upon time information associated with the information captured by the information capture device;

a code module for generating a visual representation for the portion of information; and a code module for printing a visual representation of the information written by the user and the visual representation generated for the portion of information on one or more paper pages to generate the paper document.

31. The system of claim 30 wherein the code module for determining the portion of information comprises:

a code module for identifying a first signal; and a code module for identifying, from the information captured by the information capture device, a portion of information captured by the information capture device in response to the signal.

32. The system of claim 30 wherein the code module for determining the portion of information comprises selecting the portion of information when a threshold associated with a rule has been satisfied.

33. A computer program, stored on computer readable medium, for generating a paper document based upon information written by a user on a sheet of paper and based upon information captured by an information capture device, the computer program comprising instructions for:

accessing first information representative of markings left by the user on the sheet of paper, the markings representative of information written by the user on the sheet of paper;

determining a portion of information from information captured by the information capture device;

wherein the instructions for determining the portion of information comprise instructions for:

identifying, from the first information, a mark written by the user;

determining time information associated with the mark; and identifying the portion of information based upon the time information associated with the mark and based upon time information associated with the information captured by the information capture device;

generating a visual representation for the portion of information; and printing a visual representation of the information written by the user and the visual representation generated for the portion of information on one or more paper pages to generate the paper document.

34. The computer program of claim 33 wherein the instructions for determining the portion of information comprise instructions for: identifying a first signal; and identifying, from the information captured by the information capture device, a portion of information captured by the information capture device in response to the signal.

35. The computer program of claim 33 wherein the instructions for determining the portion of information comprise instructions for selecting the portion of information when a threshold associated with a rule has been satisfied.

36. A computer program, stored on computer readable medium, for generating a paper document based upon information written by a user on one or more sheets of paper and based upon information captured during an information communication event by one or more information capture devices, the computer program comprising instructions for:

accessing first information representative of markings left by the user on the one or more sheets of paper, the markings representative of information written by the user on the one or more sheets of paper;

determining, from the information captured by the one or more information capture devices, one or more portions of information;

wherein the instructions for determining the one or more portions of information comprise instructions for:

identifying one or more marks from the first information, each mark indicating that a portion of information from the information captured by the one or more information capture devices is to be integrated with the information written by the user;

determining time information associated with each mark in the one or more marks; and identifying, from the information captured by the one or more information capture devices, a portion of information for each mark in the one or more marks based upon the time information associated with the mark and based upon time information associated with the information captured by the one or more information capture devices;

generating a visual representation for each portion of information in the one or more portions of information; and generating a paper document wherein contents of the paper document comprise a visual representation of the information written by the user on the one or more sheets of paper and the visual representations generated for the one or more portions of information.

37. The computer program of claim 36 wherein the instructions for identifying the portion of information for each mark in the one or more marks comprise instructions for:

identifying an information capture device from the one or more information capture devices for the mark; and selecting a portion of information captured by the information capture device identified for the mark.

38. The computer program of claim 37 wherein the instructions for identifying the information capture device for the mark comprise instructions for: determining a type of information corresponding to the mark; identifying a set of information capture devices from the one or more information capture devices that are configured to record the type of information corresponding to the mark; and selecting an information capture device from the set of information capture devices for the mark.

39. The computer program of claim 36 wherein the instructions for generating the paper document comprise instructions for:

generating an electronic representation comprising a visual representation of the information written by the user and the visual representations generated for the one or more portions of information; and printing the electronic representation on one or more paper pages to generate the paper document.

40. The computer program of claim 39 wherein the instructions for generating the electronic representation comprise instructions for:

determining a location in the visual representation of the information written by the user for placing each visual representation; and generating the electronic representation such that each visual representation is placed in the visual representation of the information in the location determined for the visual representation.

41. The computer program of claim 36 wherein the instructions for generating the visual representation for each portion of information in the one or more portions of information comprise instructions for:

determining a type of information for each portion of information; and generating the visual representation for a portion of information based upon the type of information determined for the portion of information.

42. The computer program of claim 36 wherein the one or more portions of information include a first portion comprising audio information and wherein the instructions for generating the visual representation comprise instructions for transcribing the audio information in the first portion.

43. The computer program of claim 36 wherein the one or more portions of information include a first portion comprising video information and wherein the instructions for generating the visual representation comprise instructions for selecting a keyframe from the video information of the first portion.

44. The computer program of claim 36 wherein the instructions for determining the one or more portions of information comprise instructions for:

identifying a signal that caused capture of information by a first information capture device from the one or more information capture devices; and identifying information captured by the first information capture device in response to the signal.

45. The computer program of claim 44 wherein the contents of the paper document comprise a visual representation of the information captured by the first information capture device in response to the signal.

46. The computer program of claim 36 wherein the one or more portions of information includes a first portion and the instructions for determining the one or more portions of information comprise instructions for selecting the first portion when a threshold associated with a rule has been satisfied.

* * * * *